US011582562B2

(12) United States Patent
Jensen et al.

(10) Patent No.: US 11,582,562 B2
(45) Date of Patent: Feb. 14, 2023

(54) HEARING SYSTEM COMPRISING A PERSONALIZED BEAMFORMER

(71) Applicant: Oticon A/S, Smørum (DK)

(72) Inventors: Jesper Jensen, Smørum (DK); Nels Hede Rohde, Smørum (DK); Thomas Bentsen, Smørum (DK); Michael Syskind Pedersen, Smørum (DK); Svend Oscar Petersen, Smørum (DK)

(73) Assignee: Oticon A/S, Smørum (DK)

( * ) Notice: Subject to any disclaimer, the term of this patent is extended or adjusted under 35 U.S.C. 154(b) by 10 days.

(21) Appl. No.: 17/109,329

(22) Filed: Dec. 2, 2020

(65) Prior Publication Data
US 2021/0168518 A1   Jun. 3, 2021

(30) Foreign Application Priority Data
Dec. 3, 2019   (EP) .................................... 19213181

(51) Int. Cl.
*H04R 25/00*   (2006.01)
*G06N 3/04*    (2023.01)
(Continued)

(52) U.S. Cl.
CPC ............. *H04R 25/407* (2013.01); *G06N 3/04* (2013.01); *G06N 3/08* (2013.01); *G10L 25/60* (2013.01);
(Continued)

(58) Field of Classification Search
CPC ...... H04R 3/005; H04R 1/406; H04R 25/407; H04R 2430/20; H04R 25/507;
(Continued)

(56) References Cited

U.S. PATENT DOCUMENTS 8,768,496 B2   7/2014  Katz et al.
11,115,762 B2 *  9/2021 Sigwanz ................. G10L 25/51
(Continued)

FOREIGN PATENT DOCUMENTS

EP   2 928 215 A1    10/2015
WO  WO 2013/064943 A1   5/2013

OTHER PUBLICATIONS

Moore et al., "Personalized signal-independent beamforming for binaural hearing aids," The Journal of the Acoustical Society of America, vol. 145, No. 5, May 2019 (published online May 16, 2019), pp. 2971-2981.

*Primary Examiner* — Norman Yu
(74) *Attorney, Agent, or Firm* — Birch, Stewart, Kolasch & Birch, LLP

(57) ABSTRACT

A hearing system configured to be located at or in the head of a user, comprises a) at least two microphones providing at least two electric input signals, b) an own voice detector, c) access to a database ($O_l$, $H_l$) comprising c1) relative or absolute own voice transfer function(s), and corresponding c2) absolute or relative acoustic transfer functions for a multitude of test-persons, d) a processor connectable to the at least two microphones, to the own voice detector, and to the database. The processor is configured A) to estimate an own voice relative transfer function for sound from the user's mouth to at least one of the at least two microphones, and B) to estimate personalized relative or absolute head related acoustic transfer functions from at least one spatial location other than the user's mouth to at least one of the microphones of the hearing system in dependence of the estimated own voice relative transfer function(s) and the database ($O_l$, $H_l$). The hearing system further comprises e) a beamformer configured to receive the at least two electric input signals, or processed versions thereof, and to determine personalized beamformer weights based on the per- (Continued)

sonalized relative or absolute head related acoustic transfer functions or impulse responses. A method of determining personalized beamformer coefficients ($w_k$) is further disclosed.

20 Claims, 11 Drawing Sheets

(51) Int. Cl.
  *G06N 3/08* (2023.01)
  *G10L 25/60* (2013.01)
  *G10L 25/84* (2013.01)
(52) U.S. Cl.
  CPC ............ G10L 25/84 (2013.01); H04R 25/405 (2013.01); H04R 25/507 (2013.01); *H04R 2225/43* (2013.01)
(58) Field of Classification Search
  CPC .... H04R 2430/23; H04R 25/405; H04R 3/04; H04R 25/40; H04R 1/20; H04R 2225/43; G10L 2021/02166; G10L 25/78; G10L 25/84; G10L 25/60; G10L 25/69
  USPC ...... 381/92, 122, 91, 58, 110; 704/208, 246, 704/251, 214
  See application file for complete search history.

(56) References Cited

U.S. PATENT DOCUMENTS

| | | | |
|---|---|---|---|
| 2007/0009122 A1* | 1/2007 | Hamacher | H04R 25/453 381/312 |
| 2013/0051565 A1* | 2/2013 | Pontoppidan | H04R 25/353 381/23.1 |
| 2018/0014130 A1* | 1/2018 | Lu | A61F 11/06 |
| 2018/0270603 A1 | 9/2018 | Gamper et al. | |

* cited by examiner

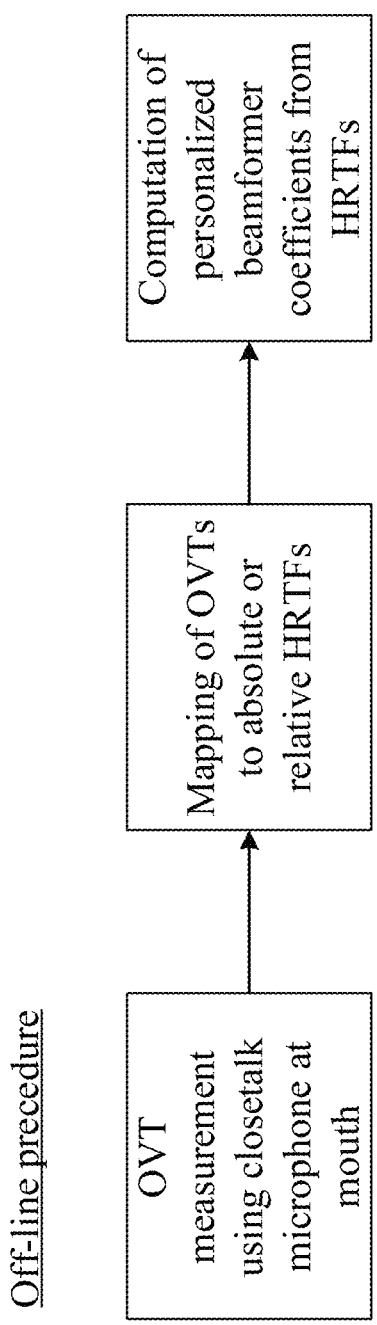
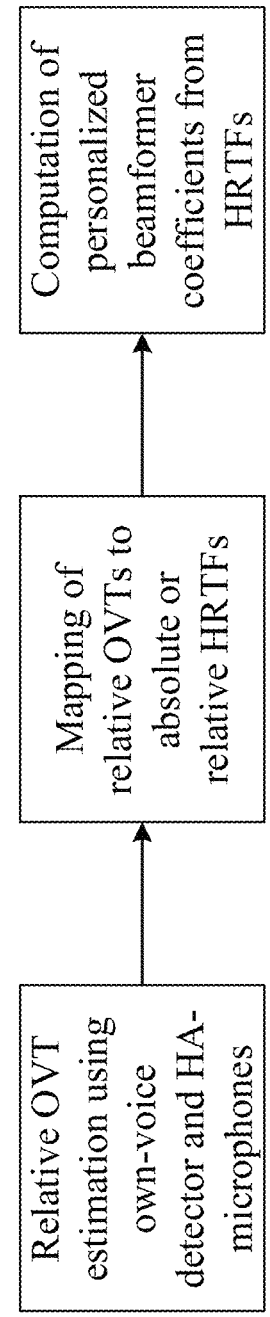
FIG. 1A
FIG. 1B

Database ($O_l$, $H_l$):

| Test subject $l$ | $OVT_l(k,i)$ | $HRTF_l(\theta,k,i)$ | | |
|---|---|---|---|---|
| Test subject 1 | $OVT_1(k,i)$ | $HRTF_1(\theta 1,k,i)$ | $HRTF_1(\theta 2,k,i)$ | ••• |
| Test subject 2 | $OVT_2(k,i)$ | $HRTF_2(\theta 1,k,i)$ | $HRTF_2(\theta 2,k,i)$ | ••• |
| ⋮ | ⋮ | ⋮ | | |
| Test subject L | $OVT_L(k,i)$ | $HRTF_L(\theta 1,k,i)$ | $HRTF_1(\theta 2,k,i)$ | ••• |

HEARING SYSTEM COMPRISING A PERSONALIZED BEAMFORMER

SUMMARY

Spatial noise reduction systems (beamformers) in hearing aids typically operate by combining sound signals captured by several microphones, in order to enhance signals from certain directions and attenuate sounds from other directions. The beamformer coefficients are often found from a priori acoustic measurements on a head-and-torso-simulator (e.g. HATS 4128C from Brüel & Kjær Sound & Vibration Measurement A/S) in a sound studio at the hearing manufacturer, prior to product launch. The resulting beamformer coefficients are then 'hard-wired' (e.g. stored or otherwise implemented) in the hearing aid. As a consequence, each and every hearing aid user are exposed to the same, HATS-derived, beamformer coefficients.

It is, however, known that HATS-derived beamformers are not necessarily optimal for each and every person (cf. e.g. [Moore; 2019]). This is, at least partly, so, because head (and torso) acoustics of individuals may differ from those of a HATS as well as depend on how the mounted instrument is positioned on different individuals. Ideally, the beamformer used by a specific user would be derived via the head-and-torso acoustics of that person. This, however, would require acoustic measurements performed on each and every hearing-aid customer. More specifically, measurements of individual head related transfer functions (HRTFs), i.e., the acoustic transfer function from points, e.g., on one or more (concentric) circle(s) in a horizontal plane centred at the users' head (with radii above 0.5 m), to each and every microphone of the hearing aid system, should preferably be performed. The microphones of the hearing system will thereby be located in an acoustic far-field with respect to sound emitted from these points. Such measurements generally require high-end audio equipment, and, ideally, access to a sound studio. It is infeasible to conduct such measurements at the clinic of the typical hearing care professional (HCP).

It is a purpose of the present disclosure to provide personalized head related transfer functions that (approximately) reflect asymmetries of the user's head and torso (that deviate from a typically standard (symmetric) model (e.g. HATS)). Such deviations may e.g. originate from size, form, and location of the ears on the head, and dimensions and form of the head and torso.

The present application proposes a method that can retrieve information about a hearing aid user's HRTFs, which does not require access to advanced audio equipment, but which can be conducted at the HCPs clinic or even during everyday use of the hearing aid system, e.g., in the home of the hearing aid user. From this information, personalized beamformers may be constructed, which perform better for each individual hearing aid user, than the traditional beamformers derived from HATS (standard model) measurements.

In an aspect, the present application proposes an offline procedure for estimating personalized beamformer coefficients for a particular user from information regarding personal own-voice-transfer function(s). The offline procedure comprises:
  A. Measurement of own voice transfer function(s) using a close-talk microphone located at the mouth of a user;
  B. Mapping of the measured own voice transfer function(s) to a set of absolute or relative head related transfer functions;
  C. Computation of personalized beamformer coefficients from the set of head related transfer functions.

In a further aspect, the present application proposes an online procedure for estimating personalized beamformer coefficients for a particular user from information regarding personal own-voice-transfer function(s). The online procedure comprises:
  A. Estimation of relative own voice transfer function(s) using an own-voice detector and microphones of a hearing device mounted at an ear of the user;
  B. Mapping of own voice transfer function(s) to a set of absolute or relative head related transfer functions;
  C. Computation of personalized beamformer coefficients from the set of head related transfer functions.

A Hearing System:

The general idea is to make measurements of the acoustic mouth-to-microphone transfer functions (own-voice transfer functions (OVTs)) of an individual user, and then map these personal OVTs to personal HRFTs, from which personalized beamformer coefficients may be derived. While it is generally infeasible to conduct HRFT measurements at the HCP, it is feasible to conduct OVT measurements at the HCP, as this does not require an advanced audio setup. Specifically, absolute or relative OVTs (defined below) can be measured, e.g., at the HCP using a single microphone placed close to the mouth of the hearing aid user (here termed a 'close talk microphone'), who is wearing hearing aids during the measurement (cf. e.g. FIG. 1A, or FIG. 2).

Furthermore, we propose methods for estimating relative OVTs, which only use the microphones of the hearing aid and which do not require additional microphones. The relative OVTs are estimated during hearing aid usage, when the user speaks (cf. e.g. FIG. 1B) (see detailed description for more details). While relative OVTs are less informative than absolute OVTs, their big advantage is that they can be estimated during everyday use of the hearing system. Hence, using relative transfer functions allows for a scheme, where variations of the relative OVT, e.g., due to changes in HA location (e.g. when mounted on the user's head), may be tracked.

Given personal absolute or relative OVT estimates any of the methods outlined below may be used to estimate personal HRTFs/beamformer coefficients, which are close-to-optimal for the individual hearing aid user.

In the present context, a head related transfer function for a particular user is taken to mean a transfer function from a given location around the user to a microphone located at or in an ear of the user, where it is assumed that the user (and thus the microphone) is located in an acoustic far-field relative to sound from the given location. An own voice transfer function for a particular user is, on the other hand, taken to mean a transfer function from the user's mouth to a microphone located at or in an ear of the user, where it is assumed that the microphone is located in an acoustic near-field relative to sound from the user's mouth. A differentiation between acoustic far-field and acoustic near-field is discussed below.

In an aspect of the present application, a hearing system configured to be located at or in the head of a user (e.g. at or in an ear, e.g. in the head at an ear) is provided. The hearing system comprises
  at least two microphones, one of which being denoted the reference microphone, each for converting sound from the environment of the hearing system to an electric input signal representing said sound as received at the location of the microphone in question;

an own voice detector configured to estimate whether or not, or with what probability, said at least two electric input signals, or a processed version thereof, comprises a voice from the user of the hearing system, and to provide an own voice control signal indicative thereof;

a memory wherein a database (Ol, Hl) of absolute or relative acoustic transfer functions or impulse responses, or any transformation thereof, for a multitude of test-persons are stored, or a transceiver allowing access to said database (Ol, Hl). The database (Ol, Hl) comprises for each of said multitude of test-persons;

a relative or absolute own voice transfer function or impulse response, or any transformation thereof, for sound from the mouth of a given test-person among said multitude of test-persons to at least one of the microphones of a microphone system worn by said given test-person, and a relative or absolute head related acoustic transfer function or impulse response, or any transformation thereof, from at least one spatial location other than the given test-person's mouth to at least one of the microphones of the microphone system worn by said given test-person;

The hearing system may further comprise a processor connected or connectable to the at least two microphones, to said own voice detector, and to said database. The processor may be configured to estimate an own voice relative transfer function for sound from the user's mouth to at least one of the at least two microphones in dependence of said at least two electric input signals, or a processed version thereof, and on said own voice control signal; and to estimate personalized relative or absolute head related acoustic transfer functions or impulse responses from at least one spatial location other than the user's mouth to at least one of the microphones of said hearing system worn by said user in dependence of said estimated own voice relative transfer function(s) and said database (Ol, Hl).

The hearing system may further comprise a beamformer configured to receive said at least two electric input signals, or processed versions thereof, and to determine personalized beamformer weights based on said personalized relative or absolute head related acoustic transfer functions or impulse responses. The estimated personalized relative or absolute head related acoustic transfer functions may, however, be used by other algorithms than the beamformer, e.g. a compression algorithm (e.g. to ensure that directional cues are appropriately maintained). In a general sense the estimated personalized relative or absolute head related acoustic transfer functions may be used by a signal processor of a hearing aid to improve processing of the input signal (e.g. to improve sound sensation (e.g. spatial sound perception and/or speech intelligibility) for a hearing impaired user).

Thereby an improved hearing system may be provided.

Impulse responses and transfer functions of sound may represent the same physical change of a sound from one location to another as determined by an acoustic propagation channel between the two locations, the impulse response being a time domain representation of the physical change and the transfer function being a frequency domain representations thereof. One can (in principle) be obtained from the other by a Fourier or inverse Fourier transformation, respectively. Other transforms (e.g. the cosine or sine transforms, the Laplace transform, etc.) than the Fourier transform may be used to provide a representation of the influence of the acoustic propagation channel.

The database may or may not comprise data measured on the user. Such data regarding the user may e.g. comprise old data, e.g. from a previous fitting.

The beamformer may be an MVDR beamformer. A beamformed signal may be provided based on the personalized beamformer weights derived from the personalized relative or absolute head related acoustic transfer functions or impulse responses.

The beamformer weights may be determined in dependence of the own voice control signal. The beamformer weights may be determined in dependence of a voice activity control signal from a (general) voice activity detector.

The hearing system may be configured to determine or update the personalized beamformer weights using the disclosed procedure according to a predefined scheme, e.g. upon fulfilment of a specific criterion. The predefined scheme may e.g. comprise initiating an update triggered by a specific event, e.g. power-up of the hearing device. The predefined scheme may e.g. comprise a continuous update, e.g. triggered by a timer, e.g. so that an update is made according to a predefined (or adaptively determined) scheme, or at regular intervals, e.g. every 10 s, or every hour, or between every 1 s and every hour. The hearing system may comprise a user interface allowing a user to initiate (or define or select a scheme for) an update of the personalized beamformer weights using the disclosed procedure.

The hearing system may comprise a processor connected to said beamformer and configured to receive said beamformed signal, or a processed version thereof, and to apply one or more processing algorithms thereto to provide a processed signal.

The hearing system may comprise an output unit for generating stimuli perceivable as sound to the user based on said at least two electric input signals, or a processed version thereof. The output unit may comprise a loudspeaker.

The hearing system may comprise further detectors or estimators (in addition to the own voice detector) intended to validate the estimate of the own voice relative transfer function. The hearing system may comprise a detector or estimator of a current signal quality in dependence of said at least two electric input signals, or a processed version thereof. The hearing system may comprise a noise estimator, e.g. for providing an estimate of a current noise level (e.g. during an estimate of the own voice transfer function). The hearing system may e.g. comprise an SNR estimator for providing an estimate of signal to noise ratio (or equivalent). The hearing system may be configured to only accept an estimate of the own voice relative transfer function in case a criterion involving other detectors or estimators than the own voice detector is fulfilled. The criterion may e.g. be that own voice is detected with a probability larger than a minimum OV-value, and that SNR is estimated to be larger than a minimum SNR-value and/or that a noise level is smaller than or equal to a threshold level.

Preferably, the microphone systems worn by the multitude of test-persons comprise microphones located essentially at the same positions as the at least two microphones of the hearing system. The microphone systems worn by said multitude of test-persons may e.g. be embodied in a hearing system identical to or equivalent with the hearing system worn by the user. The microphone systems worn by said multitude of test-persons may be identical from test-person to test-person. The respective locations of the microphones of the microphone system relative to the ears of the wearer (test-person) are preferably essentially equal to the location of the at least two microphones of the hearing system when located on the user. The directional characteristics of the microphones of the microphone system are preferably essentially equal to the at least two microphones of the hearing system. The microphones of the microphone system and the at least two microphones of the hearing system may be omni-directional microphones.

The processor may comprise a relative own voice transfer function estimator for estimating a relative own voice transfer function vector $OVT_{k,user}$ whose elements are the relative transfer functions for sound from the user's mouth to each of the at least two microphones of the hearing system. For a two microphone system, the relative own voice transfer function vector $OVT_{k,user}$ will have two elements, one of which will be 1 corresponding to the reference microphone).

The hearing system may comprise an own-voice power spectral density estimator configured to provide an estimate of the own-voice power spectral density vector $S_k$ at a given point in time. The own-voice power spectral density vector $S_k$ may be used as input to the relative own voice transfer function estimator. The own-voice power spectral density vector $S_k$ at a given point in time may be determined when the own voice control signal indicated the presence of the user's own voice (with a high probability, e.g. ≥75%).

The hearing system may comprise a personalized head related transfer functions estimator for estimating said personalized relative or absolute head related acoustic transfer functions $d_{k,user}$ or impulse responses from said estimated own voice transfer function vector $OVT_{k,user}$ and said database $(O_l, H_l)$. The personalized head related transfer functions estimator may e.g. be configured to select the relative or absolute head related acoustic transfer functions database $(O_l, H_l)$ corresponding to the person $l^*$ for which the distance (e.g. difference) between the estimated own voice transfer function vector $OVT_{k,user}$ and the own voice transfer function vector $OVT_{k,l^*}$ of the database is the smallest.

The relative own voice transfer function vector $OVT_{k,user}$ may e.g. be estimated from the input own-voice power spectral density vector $S_k$ as $OVT_{k,user}=\mathrm{sqrt}(S_k/S_{k,iref})$, where iref is the index of a reference microphone among the at least two microphones. Thereby a simplified relative OVT-vector is provided (containing only information about attenuation of level, whereas phase information (delay) is ignored). This may be a good approximation, since, in general, the difference in delay of a signal from the user's mouth to the different microphones of a hearing device located at an ear of the user is predominantly determined by the microphone distance (which is assumed to be essentially identical from user to user). On the hand, level differences may depend on characteristics of the individual head of the user. In case of a binaural hearing aid system comprising left and right hearing aids, the hearing aids may change (destroy) the physical interaural level differences at the two ears (due to independent compression algorithms in the two hearing aids).

The hearing system may comprise a trained neural network for determining the personalized head related transfer functions using the estimated relative own voice transfer function vector $OVT_{k,user}$ as an input vector, wherein the trained neural network has been trained using the database $(O_l, H_l)$. Based on an a priori database, a neural network (e.g. a deep neural network) may be trained in an offline procedure prior to use in a hearing system, using $O_l$ and $H_l$ as target outputs, respectively. The personalized head related transfer functions may alternatively be determined by other statistical methods/models involving supervised learning, machine learning, artificial intelligence, etc.

The hearing system may be constituted by or comprise a hearing device, e.g. a hearing aid. The hearing system may be constituted by or comprise a hearing aid, a headset, an earphone, an ear protection device or a combination thereof. The hearing device, e.g. a hearing aid, may comprise the at least two microphones. One of the microphones may be located at or in an ear canal of the user. One of the microphones may be located at or behind an ear (pinna) of the user. The hearing device may comprise three microphones, one of which may be located at or in an ear canal of the user.

The hearing system may be constituted by or comprise a binaural hearing system, e.g. a binaural hearing aid system comprising left and right hearing devices configured to be located at left and right ears, respectively, of a user.

The hearing system may comprise a hearing device and an auxiliary device. The hearing system may be adapted to establish a communication link between the hearing device and the auxiliary device to provide that information (e.g. control and status signals, possibly audio signals) can be exchanged or forwarded from one to the other. The auxiliary device may comprise a remote control, a smartphone, or other portable or wearable electronic device, such as a smartwatch or the like. The auxiliary device may be constituted by or comprise a remote control for controlling functionality and operation of the hearing device(s). The function of a remote control is implemented in a smartphone, the smartphone possibly running an APP allowing to control the functionality of the audio processing device via the smartphone (the hearing device(s) comprising an appropriate wireless interface to the smartphone, e.g. based on Bluetooth or some other standardized or proprietary scheme). The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device. The auxiliary device may be constituted by or comprise another hearing device.

The hearing system may comprise a hearing device adapted for being located at or in an ear of a user. The at least two microphones may be located in the hearing device. At least one of the at least two microphones may be located at a left ear of the user. At least one of the at least two microphones may be located at a right ear of the user. The hearing system may comprise first and second hearing devices adapted for being located at or in left and right ears of the user, and/or for being fully or partially implanted in the head of the user. The at least two microphones may be located in the first and second hearing devices.

A Hearing Device for Use in a Hearing System:

The hearing device may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal.

The hearing device may comprise an output unit for providing a stimulus perceived by the user as an acoustic signal based on a processed electric signal. The output unit may comprise a number of electrodes of a cochlear implant (for a CI type hearing device) or a vibrator of a bone conducting hearing device. The output unit may comprise an output transducer. The output transducer may comprise a receiver (loudspeaker) for providing the stimulus as an acoustic signal to the user (e.g. in an acoustic (air conduction based) hearing device). The output transducer may comprise a vibrator for providing the stimulus as mechanical vibration of a skull bone to the user (e.g. in a bone-attached or bone-anchored hearing device).

The hearing device may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing device may comprise a directional microphone system adapted to spatially filter sounds from the environment, and thereby enhance a target acoustic source among a multitude of acoustic sources in the local environment of the user wearing the hearing device. The directional system is adapted to detect (such as adaptively detect) from which direction a particular part of the microphone signal originates. This can be achieved in various different ways as e.g. described in the prior art. In hearing devices, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, e.g. less than 20 g.

The hearing device may comprise a forward or signal path between an input unit (e.g. an input transducer, such as a microphone or a microphone system and/or direct electric input (e.g. a wireless receiver)) and an output unit, e.g. an output transducer. The signal processor is located in the forward path. The signal processor is adapted to provide a frequency dependent gain according to a user's particular needs. The hearing device may comprise an analysis path comprising functional components for analyzing the input signal (e.g. determining a level, a modulation, a type of signal, an acoustic feedback estimate, etc.). Some or all signal processing of the analysis path and/or the signal path may be conducted in the frequency domain. Some or all signal processing of the analysis path and/or the signal path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or $x[n]$) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s$=20 kHz. A number of audio samples may be arranged in a time frame. A time frame may comprise 64 or 128 audio data samples. Other frame lengths may be used depending on the practical application.

The hearing device may comprise an analogue-to-digital (AD) converter to digitize an analogue input (e.g. from an input transducer, such as a microphone) with a predefined sampling rate, e.g. 20 kHz. The hearing devices comprise a digital-to-analogue (DA) converter to convert a digital signal to an analogue output signal, e.g. for being presented to a user via an output transducer.

The hearing device, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing device from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal is in the present context taken to include a speech signal from a human being. It may also include other forms of utterances generated by the human speech system (e.g. singing). The voice activity detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. an acceleration sensor. The movement detector is configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic situation (input level, feedback, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a trained neural network.

The hearing device may further comprise other relevant functionality for the application in question, e.g. compression, noise reduction, feedback control, etc.

The hearing device may comprise a listening device, e.g. a hearing aid, e.g. a hearing instrument, e.g. a hearing instrument adapted for being located at the ear or fully or partially in the ear canal of a user, e.g. a headset, an earphone, an ear protection device or a combination thereof. The hearing assistance system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device as described above, in the 'detailed description of embodiments' and in the claims, is moreover provided. Use may be provided in a system comprising audio distribution. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of estimating personalized beamformer weights for a hearing system comprising a multitude of microphones, one of which being denoted the reference microphone, is provided. The hearing system may be configured to be worn by a specific user. The method comprises, providing at least two electric signals representing sound in an environment of the user at a location of the microphones of the hearing system, the electric input signal from said reference microphone being denoted the reference microphone signal;

providing an own voice control signal indicative of whether or not, or with what probability, said at least two electric input signals, or a processed version thereof, comprises a voice from the user of the hearing system; and providing a database ($O_l$, $H_l$), or providing access to such database ($O_l$, $H_l$), of absolute or relative acoustic transfer functions or impulse responses, or any transformation thereof, for a multitude of test-persons other than said user, and for each of said multitude of test-persons providing in the database ($O_l$, $H_l$) a relative or absolute own voice transfer function or impulse response, or any transformation thereof, for sound from the mouth of a given test-person among said multitude of test-persons to at least one of a multitude of microphones of a microphone system worn by said given test-person, and providing in the database ($O_l$, $H_l$) a relative or absolute head related acoustic transfer function or impulse response, or any transformation thereof, from at least one spatial location other than the given test-person's mouth to at least one of the microphones of a microphone system worn by said given test-person;

estimating (e.g. in the hearing system, e.g. a hearing device, e.g. a hearing aid) an own voice relative transfer function for sound from the user's mouth to at least one of the at least two microphones of the hearing system in dependence of said at least two electric input signals, or a processed version thereof, and on said own voice control signal.

The method may further comprise estimating personalized relative or absolute head related acoustic transfer functions or impulse responses from at least one spatial location other than the user's mouth to at least one of the microphones of said hearing system worn by said user in dependence of said estimated own voice relative transfer function and said database ($O_l$, $H_l$); and determining personalized beamformer weights ($w_{k,user}$) for a beamformer configured to receive said at least two electric input signals, or processed versions thereof, based on said personalized relative or absolute head related acoustic transfer functions ($HRTF_l^*$) or impulse responses ($HRIR_l^*$), or any transformation thereof.

In a general sense the estimated personalized relative or absolute head related acoustic transfer functions may be used by a signal processor of a hearing aid to improve processing of the input signal (e.g. to improve sound sensation (e.g. spatial sound perception and/or speech intelligibility) for a hearing impaired user), e.g. instead of the step of determining personalized beamformer weights ($w_{k,user}$) for a beamformer.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The step of measuring an absolute or relative own voice transfer function ($OVT_{user}$) or impulse response using microphones of the hearing system for picking up an utterance of the user may comprise the use of a close-talk microphone located at the mouth of the use. Thereby an absolute voice transfer function ($OVT_{user}$) or impulse response can be measured. Alternatively, the step may comprise only using the microphones of the hearing system, whereby a relative own voice transfer function ($OVT_{user}$) can be determined by the hearing system. The own voice transfer functions or impulse responses from the mouth of the test-person (l) or the user to at least one of, such as to one or more of, e.g. to all of, the multitude of microphones may be determined. Likewise, the far-field head related transfer functions or impulse responses from a sound source at a specific location (away from the user's mouth, in the acoustic far field relative to the test-person (l)) to at least one of, such as to one or more of, e.g. to all of, the multitude of microphones may be determined. Further, the far-field head related transfer functions or impulse responses from a sound source at a multitude of locations (away from the user's mouth, in the acoustic far field relative to the test-person (l)) to at least one of, such as to one or more of, e.g. to all of, the multitude of microphones may be determined.

The timing of the determination of personalized beamformer weights ($w_{k,user}$) may be dependent on the own voice control signal.

The method may be configured to determine personalized beamformer coefficients ($w_{k,user}$) for a beamformer of the hearing system (e.g. a binaural beamformer for a binaural hearing system), e.g. for a hearing device, such as a hearing aid, of the hearing system. The beamformer may be configured to apply the beamformer weights to electric input signals from a multitude of microphones, to thereby provide a beamformed signal.

The method may comprise that the beamformer is binaural beamformer based on electric input signals from said at least two microphones located at left as well as right ears of the user. The beamformer may be based on electric input signals from the at least two microphones located at either the left or the right ear of the user.

The method may comprise mapping said relative own voice transfer function ($OVT_{user}$) or impulse response to an absolute or relative own voice transfer function ($OVT_{l*}$) or impulse response of a specific test-person l* among said multitude of test-persons from said database ($O_l$, $H_l$) according to a predefined criterion; and deriving estimated absolute or relative far-field head related transfer functions ($HRTF_{user}$) for said user in dependence of the absolute or relative far-field head related transfer functions ($HRTF_{l*}$) for said specific test-person stored in said database ($O_l$, $H_l$).

The method may be adapted to provide that the predefined criterion comprises minimization of a cost function, e.g. a distance measure.

The method may comprise the step of providing a beamformed signal based on the personalized beamformer weights.

A Method of Estimating Personalized Relative or Absolute Head Related Acoustic Transfer Functions or Impulse Responses:

In an aspect, a method of estimating personalized relative or absolute head related acoustic transfer functions or impulse responses for a user wearing a hearing system comprising a multitude of microphones is furthermore provided. The method comprises for each of a multitude L of test-persons measuring and storing in a database ($O_l$, $H_l$) an absolute or relative own voice transfer function ($OVT_l$) or impulse response using a close-talk microphone located at the mouth of a test-person (l, other than the user) for picking up an utterance of the test-person and microphones located an ear or ears of the test-person; and measuring and storing in said database ($O_l$, $H_l$) an absolute or relative far-field head related transfer function ($HRTF_l$) from at least one location different from the test-person's mouth using a sound source at said at least one location and microphones located an ear or ears of the test-person; and for the user of the hearing system measuring an absolute or relative own voice transfer function ($OVT_{user}$) or impulse response using microphones of the hearing system for picking up an utterance of the user;

mapping said absolute or relative own voice transfer function ($OVT_{user}$) or impulse response to an absolute or relative own voice transfer function ($OVT_{l*}$) or impulse response of the best matching test-person l* among said multitude of test-persons from said database ($O_l$, $H_l$) according to a predefined criterion;

Deriving estimated absolute or relative far-field head related transfer functions ($HRTF_{user}$) for said user in dependence of the absolute or relative far-field head related transfer functions ($HRTF_{l*}$) for said best matching test-person stored in said database ($O_l$, $H_l$).

The method may comprise computation of personalized beamformer coefficients ($w_k$) from said absolute or relative far-field head related transfer functions ($HRTF_{user}$) for the user. The method may be configured to determine a personalized beamformer coefficients ($w_k$) for a beamformer of the hearing system (e.g. a binaural beamformer for a binaural hearing system), e.g. for a hearing device, such as a hearing aid, of the hearing system. The beamformer may be configured to apply the beamformer weights to electric input signals from a multitude of microphones, to thereby provide a beamformed signal.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

An APP:

In a further aspect, a non-transitory application, termed an APP, is furthermore provided by the present disclosure. The APP comprises executable instructions configured to be executed on an auxiliary device to implement a user interface for a hearing device or a hearing system described above in the 'detailed description of embodiments', and in the claims. The APP is configured to run on cellular phone, e.g. a smartphone, or on another portable device allowing communication with said hearing device or said hearing system.

Definitions

The 'near-field' of an acoustic source is a region close to the source where the sound pressure and acoustic particle velocity are not in phase (wave fronts are not parallel). In the near-field, acoustic intensity can vary greatly with distance (compared to the far-field). A distinction between an acoustic near-field and far-field is related to the frequency (wavelength) of the sound and can be taken to lie around 2 wavelengths $\lambda$, i.e. for distances <$2\lambda$ from the sound source, the near-field prevail, and for distances >$2\lambda$ from the sound source, the far-field prevail. The wavelength $\lambda$ of sound is given by $\lambda=c/f$, where c is the speed of sound in air (343 m/s, @ 20° C.) and f is frequency. At f=1 kHz, e.g., the wavelength of sound is 0.343 m (i.e. 34 cm). The sound pressure from a sound source is attenuated with increasing distance L from the sound source. For afar-field sound source $S_{FF}$ (located e.g. >1 m away from a measurement location, e.g. a microphone), the sound pressure is decreased 6 dB for every doubling of the distance to the sound source. For a near-field sound source it is more complicated (variable).

In the present context, a 'hearing device' refers to a device, such as a hearing aid, e.g. a hearing instrument, or an active ear-protection device, or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing device may comprise a single unit or several units communicating (e.g. acoustically, electrically or optically) with each other. The loudspeaker may be arranged in a housing together with other components of the hearing device, or may be an external unit in itself (possibly in combination with a flexible guiding element, e.g. a dome-like element).

More generally, a hearing device comprises an input transducer for receiving an acoustic signal from a user's surroundings and providing a corresponding input audio signal and/or a receiver for electronically (i.e. wired or wirelessly) receiving an input audio signal, a (typically configurable) signal processing circuit (e.g. a signal processor, e.g. comprising a configurable (programmable) processor, e.g. a digital signal processor) for processing the input audio signal and an output unit for providing an audible signal to the user in dependence on the processed audio signal. The signal processor may be adapted to process the input signal in the time domain or in a number of frequency bands. In some hearing devices, an amplifier and/or compressor may constitute the signal processing circuit. The signal processing circuit typically comprises one or more (integrated or separate) memory elements for executing programs and/or for storing parameters used (or potentially used) in the processing and/or for storing information relevant for the function of the hearing device and/or for storing information (e.g. processed information, e.g. provided by the signal processing circuit), e.g. for use in connection with an interface to a user and/or an interface to a programming device. In some hearing devices, the output unit may comprise an output transducer, such as e.g. a loudspeaker for providing an air-borne acoustic signal or a vibrator for providing a structure-borne or liquid-borne acoustic signal. In some hearing devices, the output unit may comprise one or more output electrodes for providing electric signals (e.g. to a multi-electrode array) for electrically stimulating the cochlear nerve (cochlear implant type hearing aid). The hearing device may comprise a speakerphone (comprising a number of input transducers and a number of output transducers), e.g. for use in an audio conference situation.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory brainstem, to the auditory midbrain, to the auditory cortex and/or to other parts of the cerebral cortex.

A hearing device, e.g. a hearing aid, may be adapted to a particular user's needs, e.g. a hearing impairment. A configurable signal processing circuit of the hearing device may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing device via an interface to a programming device (fitting system), and used by a processing algorithm executed by the configurable signal processing circuit of the hearing device.

A 'hearing system' refers to a system comprising one or two hearing devices, and a 'binaural hearing system' refers to a system comprising two hearing devices and being adapted to cooperatively provide audible signals to both of the user's ears. Hearing systems or binaural hearing systems may further comprise one or more 'auxiliary devices', which communicate with the hearing device(s) and affect and/or benefit from the function of the hearing device(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person. Hearing devices or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as hearing aids or hearing aid systems.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

FIG. 1A shows an exemplary offline procedure according to the present disclosure for estimating personalized beamformer coefficients from personal own-voice-transfer function information, and FIG. 1B shows an exemplary online procedure according to the present disclosure for estimating personalized beamformer coefficients from personal own-voice-transfer function information, FIG. 2 schematically illustrates a path for sound from mouth to ear for measuring an own-voice impulse response for right-ear microphones $M_i$, i=1, 2, 3.

The figures are schematic and simplified for clarity, and they just show details which are essential to the understanding of the disclosure, while other details are left out. Throughout, the same reference signs are used for identical or corresponding parts.

Figure 2:
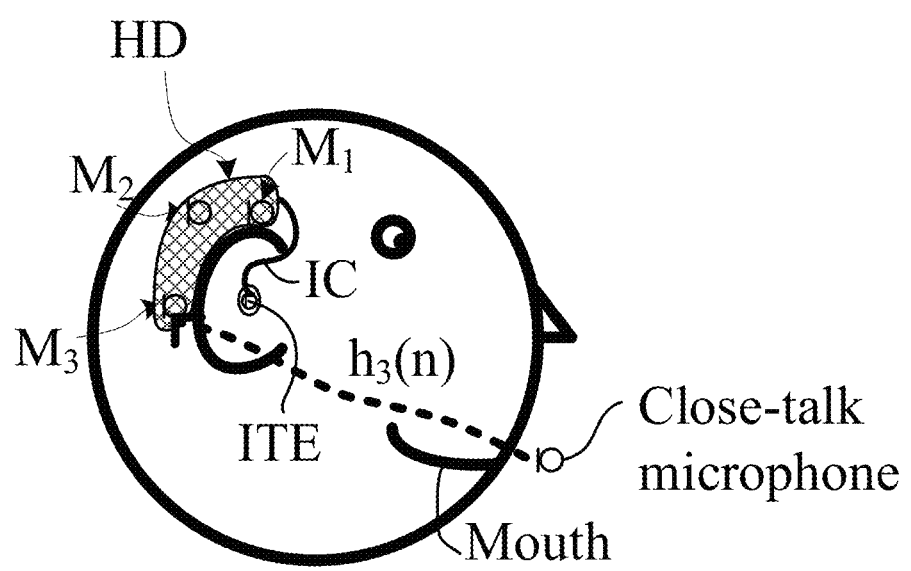

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids.

FIG. 1A shows an exemplary offline procedure according to the present disclosure for estimating personalized beamformer coefficients from personal own-voice-transfer function information. The offline procedure comprises:

A. Measurement of own voice transfer functions (OVT) using a close-talk microphone located at the mouth of a user (cf. e.g. FIG. 2)

B. Mapping of OVTs to absolute or relative head related transfer functions (HRTFs).

C. Computation of personalized beamformer coefficients from the HRTFs

FIG. 1B shows an exemplary online procedure according to the present disclosure for estimating personalized beamformer coefficients from personal own-voice-transfer function information. The online procedure comprises:

A. Estimation of relative own voice transfer functions (OVT) using own-voice detector and hearing aid (HA) microphones (cf. FIG. 3A, 3B, 3C).

B. Mapping of OVTs to absolute or relative head related transfer functions (HRTFs).

C. Computation of personalized beamformer coefficients from the HRTFs

Absolute and Relative Own Voice Transfer Functions

Let $h_i(n)$ denote an own-voice impulse response (OIR), i.e., the impulse response from a point just outside the mouth of hearing aid user (here the location of the 'Close-talk microphone') to the i'th microphone of the hearing aid (FIG. 2). Let $OVT'_{k,i}$, k=1, ..., K (K being a number of frequency bands) denote a Fourier transform of $h_i(n)$–$OVT'_{k,i}$ thus being the OVT from the mouth to the $i^{th}$ microphone. Define the absolute OVT vector $OVT'_k = [OVT'_{k,1} \ldots OVT'_{k,M}]$, where M is the number of microphones. Finally, let the relative OVT vector with respect to a pre-defined reference microphone with index iref be given by $OVT_k = OVT'_k / OVT'_{k,iref}$. Clearly, absolute OVTs carry more information than relative OVTs, because the latter can be derived from the former, but not the other way around. In other words, absolute OVTs carry explicit information about the sound traveling time from mouth to microphones, while relative OVTs do not.

FIG. 2 schematically illustrates an own-voice impulse response for right-ear microphones $M_i$, i=1, 2, 3 for an exemplary hearing device (HD) according the present disclosure. The hearing device (HD) is located at a right ear of the user. The hearing device comprises a multitude of microphones, here at least three microphones ($M_1$, $M_2$, $M_3$). The three microphones ($M_1$, $M_2$, $M_3$) are located in a BTE-part of the hearing device located at or behind the outer ear (pinna) of the user. The three microphones are located in the hearing aid (here in the BTE-part) so as to facilitate determining filter weights for a beamformer for picking up the voice of the user ('own voice') as well as for a beamformer for picking up sounds from the environment. In the exemplary embodiment of FIG. 2, the microphones are located at vertices of a triangle. The BTE-part is connected to an ITE-part adapted for being located at or in an ear canal of the user. The BTE-part and the ITE-part are connected (e.g. acoustically and/or electrically connected to each other by a connecting element (IC). The connecting element may comprise a tube for guiding sound from a loudspeaker located in the BTE-part to the ear canal of the user. The connecting element may comprise a number of electrical conductors for electrically connecting the BTE-part to the ITE-part. The ITE-part may comprise a loudspeaker located in the ear canal of the user. In the latter case, the hearing aid may implement a 'receiver in the ear' (RITE) style.

As a first step in the proposed method, the absolute or relative OVT must be estimated.

The absolute OVT vector $OVT'_k$, k=1, ..., K may be estimated, e.g., at a hearing care professional (HCP) during a hearing aid (HA) fitting using a small voice sample: the hearing aid user wears the HAs and a mouth reference microphone (cf. 'Close-talk microphone' of FIG. 2) is placed in front of the users' mouth ('Mouth' in FIG. 2). The user pronounces a few test sentences, which are recorded at the mouth reference microphone and the HA microphones (cf. $M_1$, $M_2$, $M_3$ in FIG. 2). The absolute OVT's are estimated from the microphone signals using standard system identification algorithms, e.g. for microphone $M_3$, $H_3 = (IN(M_3)/IN(M_{CT}))$, where IN(x) is the complex (frequency dependent) input signal picked up by the microphone x (x=$M_3$, $M_{CT}$). The frequency dependent input signal IN(x) may be determined from the corresponding time domain input signal (e.g. by a Fourier transform, such as a Discrete Fourier Transform (DFT)), e.g. based on a measured impulse response.

Additionally, or alternatively, the relative OVT may be used. If the absolute OVT is measured at the HCP, then the relative OVT may easily be derived from the absolute OVT. Alternatively, the relative OVT may be estimated online during everyday use of the hearing aid as follows (see FIG. 3A, 3B, 3C).

Figure 3A:
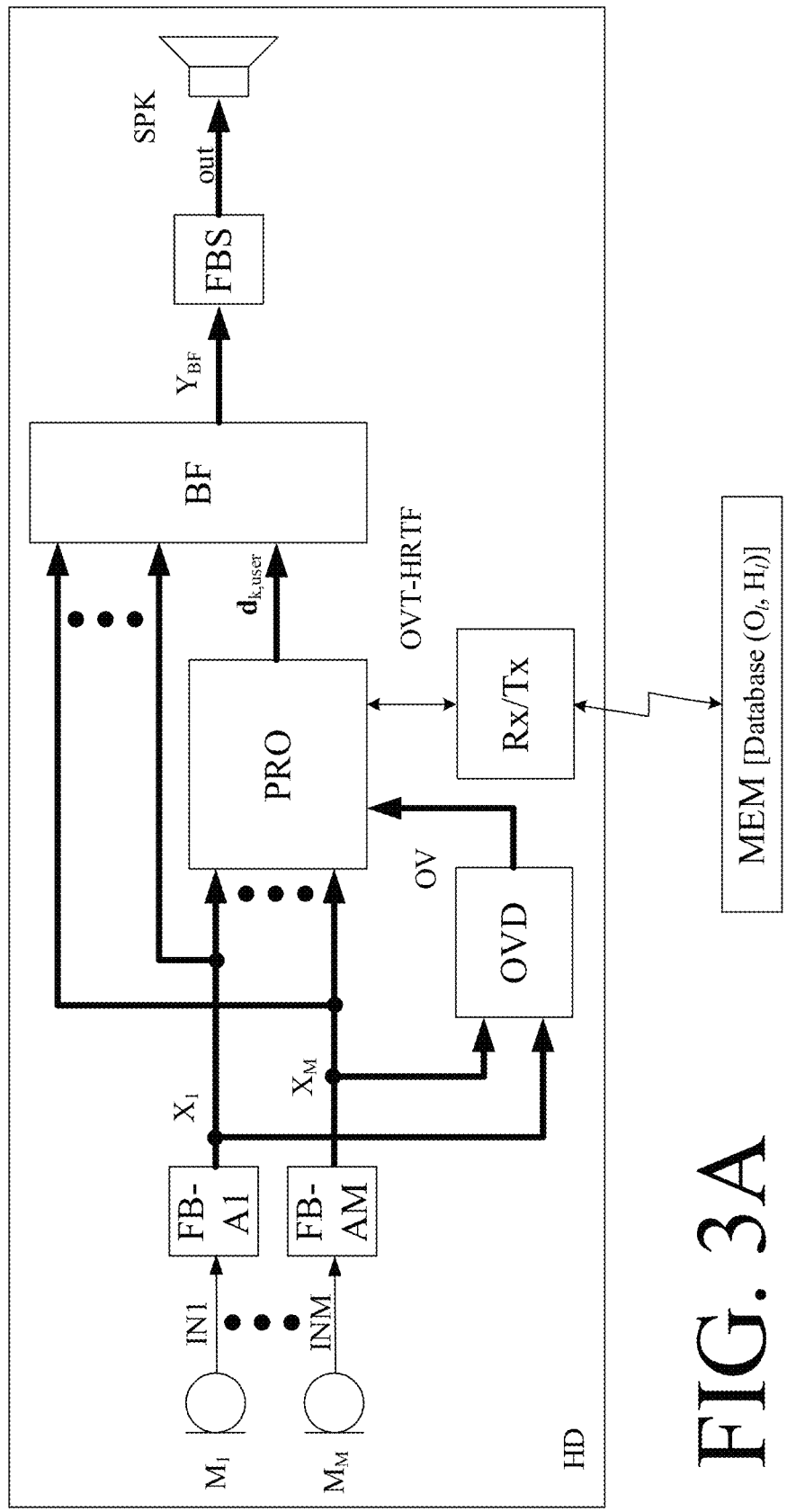
FIG. 3A shows a block-diagram of an embodiment of hearing system comprising a beamformer and a system for estimating relative own-voice transfer functions from a user's speech according to the present disclosure.

FIG. 3A shows a block-diagram of an embodiment of hearing system comprising a hearing device (HD) and an external database (MEM) accessible from the hearing device. The hearing device comprises a beamformer and a system for estimating relative own-voice transfer functions from a user's speech according to the present disclosure. The hearing device (HD) of FIG. 3A comprises a multitude (M) of microphones ($M_1$, . . . , $M_M$) configured to pick up sound from the environment of the hearing device and convert the sound to (e.g. digitized) electric input signals (IN1, . . . , INM). The hearing device (HD) further comprises analysis filter banks (FB-A1, . . . , FB-AM) for converting the multitude of (time-domain) electric input signals (IN1, . . . , INM) to respective (frequency domain) electric input signals as frequency sub-band signals ($X_1$, . . . , $X_M$). The hearing device comprises an own voice detector configured to estimate whether or not, or with what probability, said multitude of electric input signals, or a processed version thereof, comprises a voice from the user of the hearing system, and to provide an own voice control signal (OV) indicative thereof. The hearing device further comprises a processor (PRO) connected to the multitude of microphones ($M_1$, . . . , $M_M$), to the own voice detector (OVD), and to a transceiver (Rx/Tx) for providing access to a database (e.g. located on a server). The database ($O_l$, $H_l$) comprises (e.g. measured or otherwise determined/estimated) absolute or relative acoustic transfer functions or impulse responses (cf. signal OVT-HRTF retrieved from the database) for a multitude of persons. The database ($O_l$, $H_l$) comprises for each of the multitude of persons a) a relative or absolute own voice transfer function or impulse response from the mouth of a given person among said multitude of persons to at least one (e.g. all) of the microphones of a microphone system worn by the given person, and b) a relative or absolute head related acoustic transfer function or impulse response from at least one spatial location other than the given person's mouth to at least one (e.g. all) of the microphones of a microphone system worn by the given person. The transceiver (Rx/Tx) may implement a wireless connection to another device (e.g. a smartphone or the like) or to a server (e.g. a cloud server), e.g. via a network, e.g. the Internet. In an embodiment, the database (or a part thereof) is stored in a memory (MEM) of the hearing device (see e.g. FIG. 3B, 3C). The processor (PRO) is configured to estimate an own voice relative transfer function ($OVT_{user}$) from the user's mouth to at least one (e.g. to all) of the multitude of microphones ($M_1$, . . . , $M_M$) in dependence of the multitude of electric input signals (IN1, . . . , INM), or a processed version thereof, and on the own voice control signal (OV). The processor (PRO) is further configured to access the database and to estimate personalized relative or absolute head related acoustic transfer functions ($d_{k,user}$) (or corresponding impulse responses) from at least one spatial location other than the user's mouth (e.g. in front of the user) to at least one (e.g. all) of the microphones of the hearing device in dependence of the estimated own voice relative transfer function(s) ($OVT_{user}$) and the database ($O_l$, $H_l$). The hearing device further comprises a beamformer (BF) configured to receive the multitude of electric input signals (IN1, . . . , INM), or processed versions thereof ($X_1$, . . . , $X_M$), and to determine beamformer weights (Wij) based on the personalized relative or absolute head related acoustic transfer functions ($d_{k,user}$) or impulse responses and to provide a beamformed signal $Y_{BF}$ based thereon. The beamformed signal may be further processed in a further processor (see e.g. signal processor SP of FIG. 3C) before being subject to conversion to the time domain by synthesis filter bank (FB-S) providing time-domain output signal OUT that is fed to an output unit crating stimuli perceivable by the user as sound. In the embodiment of FIG. 3A, the output unit comprises a loudspeaker (SPK) for converting the signal OUT to an acoustic signal (comprising vibrations in air). Determination of beamformer weights from relative or absolute transfer functions for a given beamformer structure is well-known in the art. For an MVDR beamformer, the determination of beamformer weights $W_H(k)$ can be written as $$W_H(k) = \frac{\hat{R}_{VV}(k)\hat{d}(k)\hat{d}^*(k, i_{ref})}{\hat{d}^H(k)\hat{R}_{VV}^{-1}(k)\hat{d}(k)}$$

where $\hat{R}_{VV}(k)$ is (an estimate of) the inter-microphone noise covariance matrix for the current acoustic environment, $\hat{d}(k)$ is the estimated look vector (representing the inter-microphone transfer function for a target sound source at a given location), k is the frequency index and $i_{ref}$ is an index of the reference microphone (*denotes complex conjugate, and $H$ denotes Hermitian transposition).

Figure 3B:
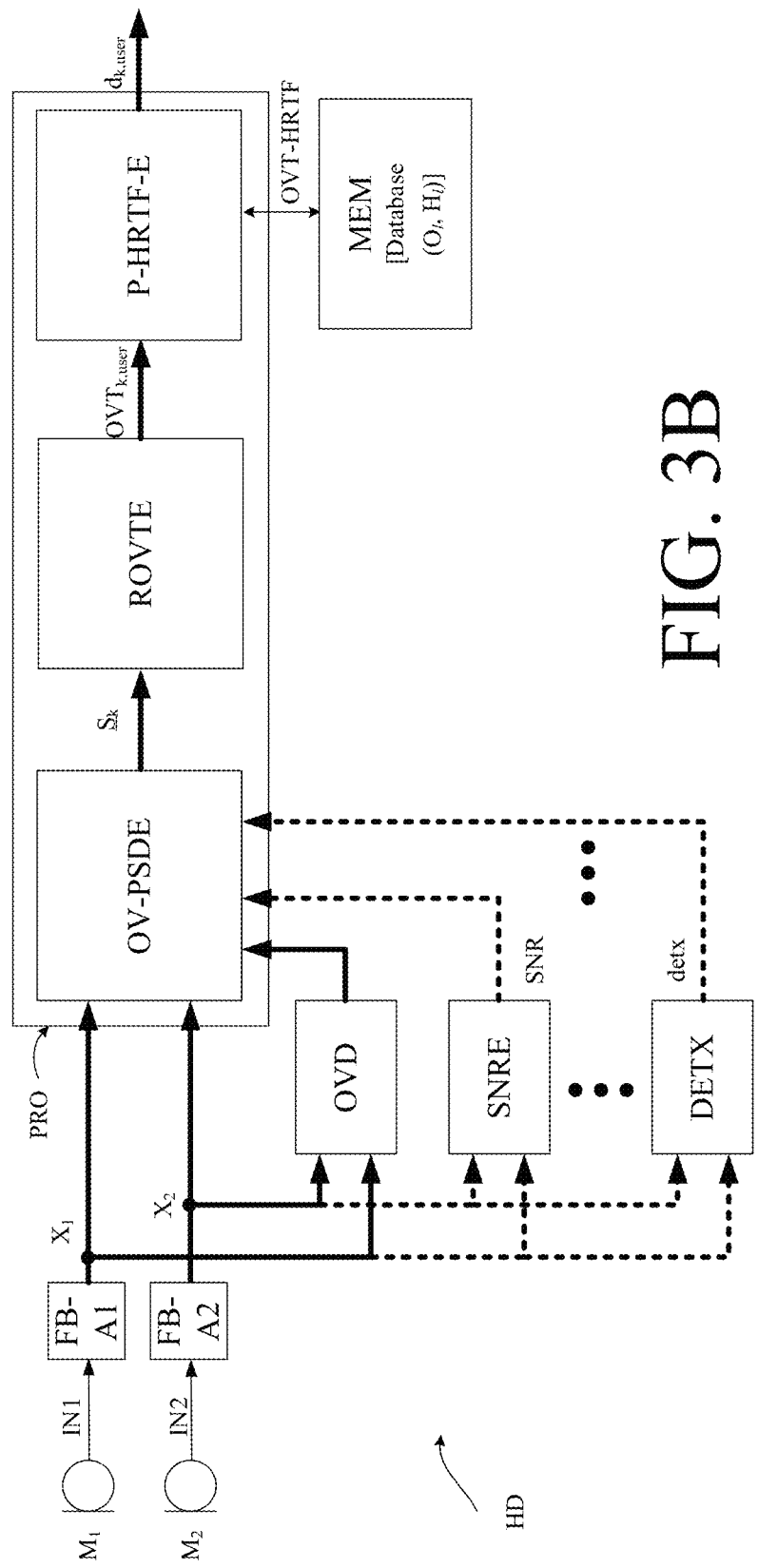
FIG. 3B shows a block-diagram of an embodiment of a hearing system for estimating relative own-voice transfer functions from a user's speech signal according to the present disclosure.

FIG. 3B shows a block-diagram of a hearing system comprising n embodiment of an online system for estimating relative own-voice transfer functions from users' speech signal. The hearing device (HD) of FIG. 3B comprises first and second microphones ($M_1$, $M_2$) configured to pick up sound from the environment of the hearing device and convert the sound to first and second (e.g. digitized) electric input signals (IN1, IN2). The hearing device (HD) further comprises first and second analysis filter banks (FB-A1, FB-A2) for converting the first and second (time-domain) electric input signals (IN1, IN2) to respective first and second (frequency domain) electric input signals as frequency sub-band signals ($X_1$, $X_2$). The first and second electric (frequency sub-band) input are fed to respective detectors (OVD, SNRE, . . . , DETX) as well as to an own-voice power spectral density estimator (OV-PSDE) providing (frequency dependent) spectral densities $S_{k,i}$ for each electric input signal ($X_1$, $X_2$) (here M=2, so i=1, 2).

The power spectral density (psd) of an audio signal is a representation of the distribution over frequencies of the energy of the signal (determined over a certain time range). A graph of power spectral density versus frequency may also be termed the 'spectral energy distribution'. For a stochastic signal (e.g. some types of noise), the power spectral density is defined as the Fourier transform of its auto-correlation function. For an audio signal, a power spectral density may e.g. be based on a prior classification of the signal, e.g. classified as 'speech' or 'noise', e.g. using a voice activity detector. The power spectral density may e.g. be determined over the time frame of a syllable, a word, a sentence or longer periods of coherent speech. In the present context of own voice, a power spectral density may appropriately be related to time periods where an own voice detector indicates the presence of own voice (e.g. with a probability above a certain threshold, e.g. 70% or 80%).

The block OVD represents an own-voice detection algorithm that continuously monitors if/when the hearing aid user speaks in a situation without too much background noise—this detection may be combined with other detectors, e.g. SNR detectors (SNRE) for robustness. The detection threshold is set such that only highly probable own-voice situations are detected—we are interested in detecting a few situations, e.g., one an hour or one every 6 hours, where own-voice is highly likely (in other words, the false-alarm rate should preferably be low). It is less important, if many own-voice situations go undetected.

Let $S_{k,i}$ denote the power spectral density of the own voice signal picked up by microphone i at frequency k, and let $S_k = [S_{k,1} \ldots S_{k,M}]$ denote a vector of such power spectral densities. In a situation, where own-voice is detected with high likelihood, the relative OVT may be estimated as $OVT_{k,user} = \text{sqrt}(S_k/S_{k,iref})$.

The own-voice power spectral density estimator (OV-PSDE) provides an estimate of the own-voice power spectral density vector $S_k = [S_{k,1} S_{k,2}]$ at a given point in time. The estimate is based on inputs from one or more detectors related to a current signal content of the first and second electric input signal ($X_1, X_2$). In the embodiment of FIG. 3B, an own voice detector (OVD) and an SNR estimator (SNRE) are indicated. The own voice detector (OVD) provides an indicator (OV=OV(k,m)) of whether or not (or with what probability), at a given time m and frequency k (i.e. time-frequency unit (k,m)), the first and/or second electric input signal(s) ($X_1, X_2$) or a signal or signals originating therefrom (e.g. a combined, e.g. beamformed, version thereof), comprises the user's own voice. The SNR estimator (SNRE) may e.g. provide an estimate (SNR=SNR(k,m)) a given time m and frequency k. The detector signals may be used to improve the estimate of own-voice power spectral density at a given point in time, e.g. utilizing an estimate of the presence of own voice (OV) and/or on an estimate of the quality of the target (own voice) speech (SNR). Other detectors (indicated in FIG. 3B as DETX providing detector signal 'detx') may e.g. comprise a movement detector (e.g. comprising an accelerometer), a signal similarity or correlation detector, e.g. an auto-correlation detector, etc.

The hearing device further comprises a relative OVT estimator (ROVTE) for estimating a relative transfer function vector $OVT_{k,user}$. The elements of the relative own voice transfer function vector are the relative transfer functions for sound from the user's mouth to each of the microphones of the hearing device, estimated from the input own-voice power spectral density vector $S_k$ as $OVT_{k,user} = \text{sqrt}(S_k/S_{k,iref})$, where iref is the index of the reference microphone. For the embodiment of FIG. 3B with only (M=) two microphones, and if the reference microphone is $M_1$ (i.e. iref=1), the relative own voice transfer function vector $OVT_{k,user}$ comprises two elements (1, $OVT_{k,user,1}$)=(1, $S_{k,2}/S_{k,1}$), k=1, . . . , K.

Figure 3C:
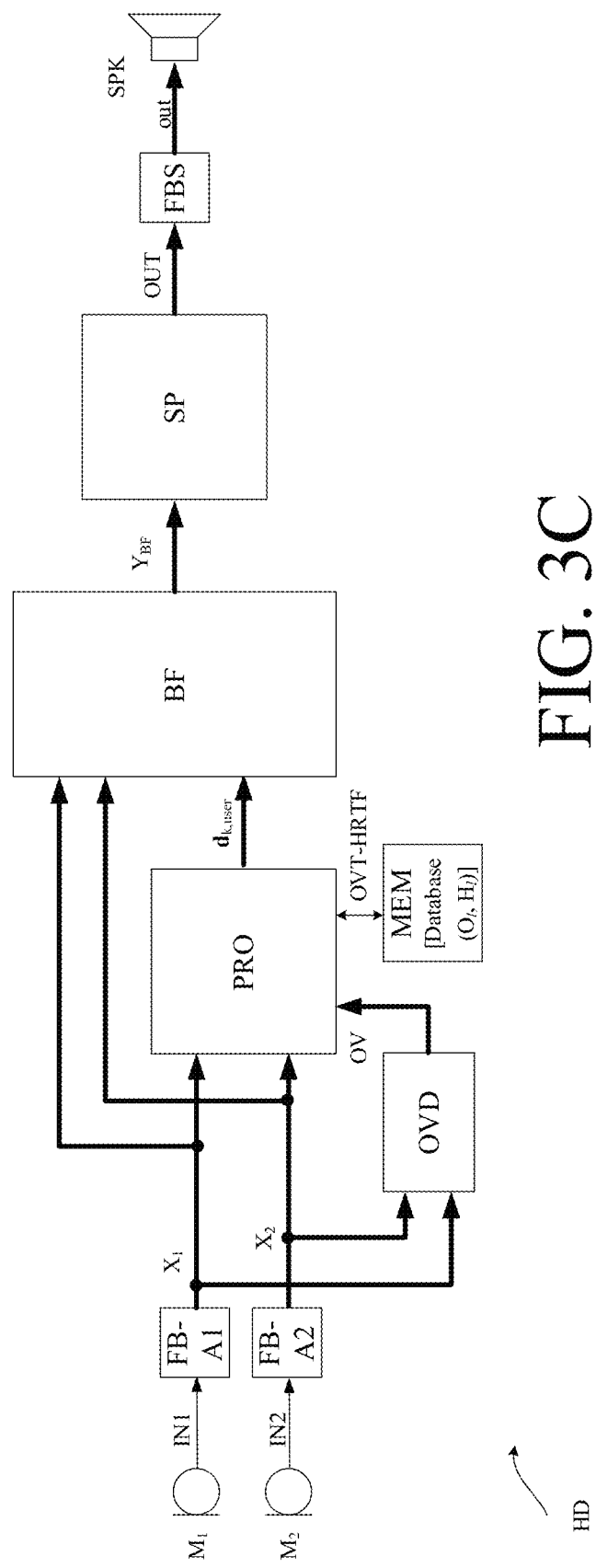
FIG. 3C shows a block-diagram of an embodiment of hearing device comprising a beamformer and a system for estimating relative own-voice transfer functions from a user's speech according to the present disclosure, FIG. 4 schematically shows a setup for measuring head-related impulse responses (or acoustic transfer functions) for a person, e.g. test subject 1, between spatial direction or location j and microphone i of a hearing system according to the present disclosure worn by the person.

The hearing device further comprises a personalized head related transfer functions estimator (P-HRTF-E) for estimating the personalized relative or absolute head related acoustic transfer functions $d_{k,user}$ or impulse responses from the estimated own voice transfer function vector $OVT_{k,user}$ and the database ($O_l, H_l$). An embodiment of the personalized head related transfer functions estimator (P-HRTF-E) is described in further detail in connection with FIG. 7. The database ($O_l, H_l$) (or a part thereof) is stored in a memory (MEM) of the hearing device (HD) FIG. 3C shows a block-diagram of an embodiment of hearing device (HD) comprising a beamformer (BF) and a system for estimating relative own-voice transfer functions (OVT) from a user's speech according to the present disclosure. The hearing device (HD) of FIG. 3C comprises the same functional elements as shown in the embodiment of a hearing system of FIG. 3A and as described in connection therewith, except that the database ($O_l, H_l$) is located in a memory (MEM) of the hearing device (instead of being implemented on a separate device accessible via a (e.g. wireless) communication link as in FIG. 3A), and that the hearing device specifically comprises two microphones ($M_1, M_2$) instead of M, where M may be larger than two.

Estimating Absolute or Relative HRTFs from Absolute or Relative OVTs

We propose to estimate absolute/relative HRTFs from the absolute/relative OVT estimates described above.

Figure 4:
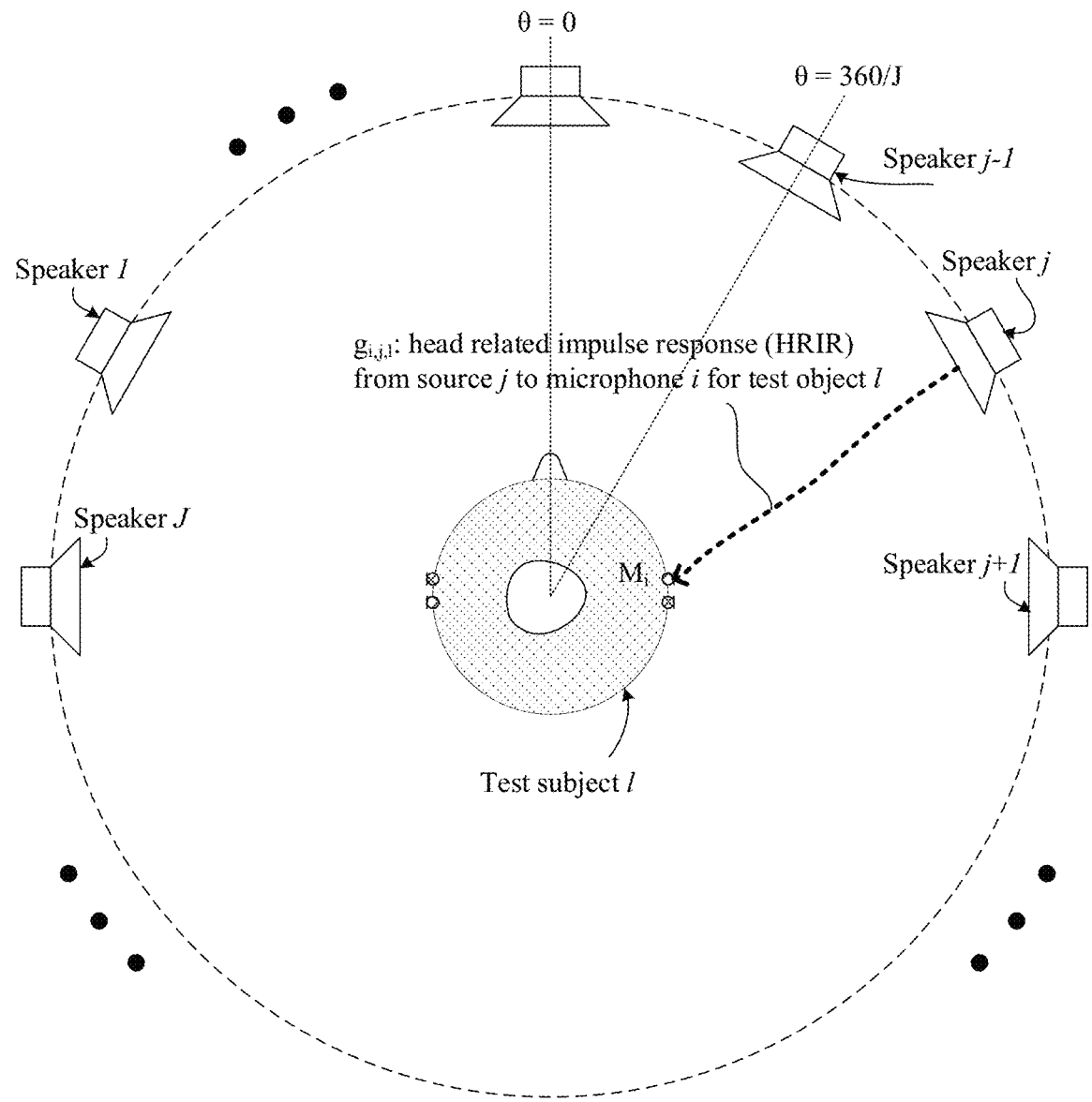

Absolute and Relative HRTFs:

Let $g_{i,j,l}(n)$ denote an impulse response (head related impulse response (HRIR)) from a $j^{th}$ point in space (at 'Speaker j' in FIG. 4) to the $i^{th}$ microphone of a hearing aid system (microphone '$M_i$' in FIG. 4) worn by user 1 ('Test subject' l in FIG. 4). For example, impulse responses may be used from spatial points (e.g. J points, cf. FIG. 4) located equidistantly on a circle in the horizontal plane (each spatial point being $(360/J)°$ apart), centered at the users' head, and at a height corresponding the users' ears (cf. dashed circle in FIG. 4). For example, a number of J=16, J=32, or J=48 points may e.g. be used.

Using an identical procedure as for OIRs, HRIRs may be transformed into absolute HRTFs: let $e'_{k,i,j,l}$, k=1, . . . , K denote a Fourier transform of the HRIR $g_{i,j,l}(n)$, where $e'_{k,i,j,l}$ is the absolute HRTF at frequency k, from spatial point j to microphone i, for the $l^{th}$ test subject. We may then form an absolute HRTF vector $e'_{k,j,l} = [e'_{k,0,j,l} \ldots e'_{k,M-1,j,l}]$ and define a relative HRTF vector $e_{k,j,l} = e'_{k,j,l}/e_{k,iref,j,l}$.

FIG. 4 schematically illustrates the geometrical arrangement defining a head-related impulse response between spatial point j and microphone i for test subject l.

A Priori Database of HRTF and OVT Pairs:

We assume that a database of ($O_l, H_l$) pairs have been collected a priori for many test subjects. Here, $O_l$ denotes one or more or all (for all microphones) pre-measured OVT's for test subject l (for example stacked as a vector), and similarly, $H_l$ denotes one or more or all HRTFs for test subject l (for example stacked as a vector).

For example, a could be the collection of absolute OVTs $OVT_{k,l}$, for all frequencies k=1, . . . , K and for all microphones for test subject l. As another example, $O_l$ could be defined as the relative transfer functions $OVT_{k,l}$ for one or some microphones for test subject l. Many other obvious variants exist (combinations of frequencies, absolute/relative OVTs, and microphone indices).

Similarly, $H_l$ could be a collection of absolute HRTFs $e'_{k,j,l}$, for all frequencies k=1, . . . , K from spatial point j. Alternatively, $H_l$ could represent a collection of absolute HRTFs for all frequencies k=1, . . . , K, and for all spatial points, j=1, . . . , J. Alternatively, $H_l$ could represent a collection of relative HRTFs for all frequencies, k=1, . . . , K, for a subset of spatial points and a subset of microphones. Many other obvious variants exist (combinations of frequencies, absolute/relative OVTs, spatial points, and microphone indices).

As an alternative to having a ($O_l, H_l$) pair, the OVT could be substituted by a transfer function measured from a certain position, e.g. as described in EP2928215A1.

Mapping from OVTs to HRTFs:

Given the a priori database of ($O_l$, $H_l$)-pairs, l=1, . . . , L (where L is the number of test objects), there exist several ways of estimating the HRTF-information of the user, $H_{user}$, from the users' OVT-information, $O_{user}$. Note that the HRTF- and OVT-information of a particular user is unlikely to be present in the a priori database.

Table Lookup Based Approach:

The OVT-information of the user, measured either at the HCP or in the online procedure as outlined above, may be compared to each and every instance of $O_l$, l=1, . . . , L, in the a priori database in order to find the data base entry, l*, for which $O_l$ matches $O_{user}$ best. For example, the least-square distance measure could be used. The corresponding estimate of the users personalized HRTF-information is then $H_l$*, where $$l^* = \mathrm{argmin}_l d(O_l, O_{user}),$$

where d(•) is a distance measure between OVTs. Several different distance measures may be used, e.g. based on minimizing an Euclidean distance.

Statistical Model based Approach:

Based on the a priori database, an a priori statistical model may be derived. In particular, if the ($O_l$, $H_l$)-pairs in the a priori data base are considered as realizations of random vector variables, then a joint probability density model f(O, H) may be fitted to the entries in the database, e.g., using a Gaussian Mixture Model or other parametric models. Given this statistical model and the estimated $O_{user}$ information of a particular user, for which an estimate of her HRTF information is desired, it is straightforward to compute minimum mean-square (mmse) estimates of the personal HRTF information:

$$H_{mmse} = \int H^* f(H|O_{user}) dH,$$

where ∫ denotes a multi-dimensional integral across all dimensions in vector H, and where f(H|O) denotes a conditional power distribution function (pdf), which can be derived from the joint pdf model f(O,H). The integral may be evaluated numerically.

Alternatively, a maximum a posteriori (map) probability estimate of $H_{user}$ may be found by maximization of the posterior probability:

$$\mathrm{HRTF}_{map} = \max_H f(O_{user}|H) * f(H),$$

where f(H) denotes a prior probability on the HRTF vector, which may, e.g., be chosen as a uniform distribution, f(H)=const. The maximization may be performed numerically.

Deep Neural Network Based Approach:

Based on the a priori database, a Deep Neural Network may be trained in an offline procedure prior to deployment, using $O_l$ and $H_l$ as target outputs, respectively. The DNN may be a feedforward network (multi-layer perceptron), a recurrent network, a convolutional network, or combinations and variants thereof. The cost function optimized during training may be mean-square error between estimated and true HRTF vectors, etc.

Finding Beamformer Coefficients from Estimated Personalized HRTFs:

From the estimated personalized HRTF information, $H_{est}$, it is straightforward to derive personalized beamformer coefficients. For example, if $H_{est}$ contains relative HRTFs $e_{k,j}$, k=1, . . . , K, for a sound source from a frontal location (j) for two microphones in the same hearing aid, then the coefficients of a Minimum Variance Distortion-Less Response (MVDR) beamformer are given by $$w_k = (R_{vv,k})^{-1} e_{k,j} / (e_{k,j}^T (R_{vv,k})^{-1} e_{k,j}),$$

where (•)$^{-1}$ denotes matrix inversion, matrix $R_{vv,k}$ is a noise-cross power spectral density matrix [Loizou] for the microphones involved, and $e_{k,j}$ is the (2-element) relative HRTF vector related to a spatial point (j) in the frontal direction.

Many other personalized beamformer variants, e.g., the Multi-Channel Wiener Filter [Brandstein], binaural beamformers (involving microphones in hearing aids on both ears) [Marquard], etc., may be derived from estimated personalized absolute/relative HRTF vectors.

Extensions:

Using HRIRs and ORIRs Rather than HRTFs and OVTs:

The concept of the present disclosure is described in terms of OVTs and HRTFs. It is, however, straightforward to exchange these quantities with the time-domain analogies, OIRs and HRIRs and perform a mapping from OIRs (estimated from a voice sample of the user, either at the HCP or in an "online" approach) to HRIRs.

Detecting Implausible OVTs:

Performing the mapping from personalized OVTs to personalized HRTFs using the "Table-based Approach" involves the computation of distances between an estimated personal OVT and OVTs of test subjects which have been measured and stored up-front in the a priori data base. The computed minimum distance may be used to estimate the reliability of the OVT measurement. Specifically, if the minimum distance exceeds a pre-specified threshold, the OVT measurement may be labeled as potentially unreliable (e.g., due to noise, reverberation, or other problems during the OVT estimation process).

Figure 5:
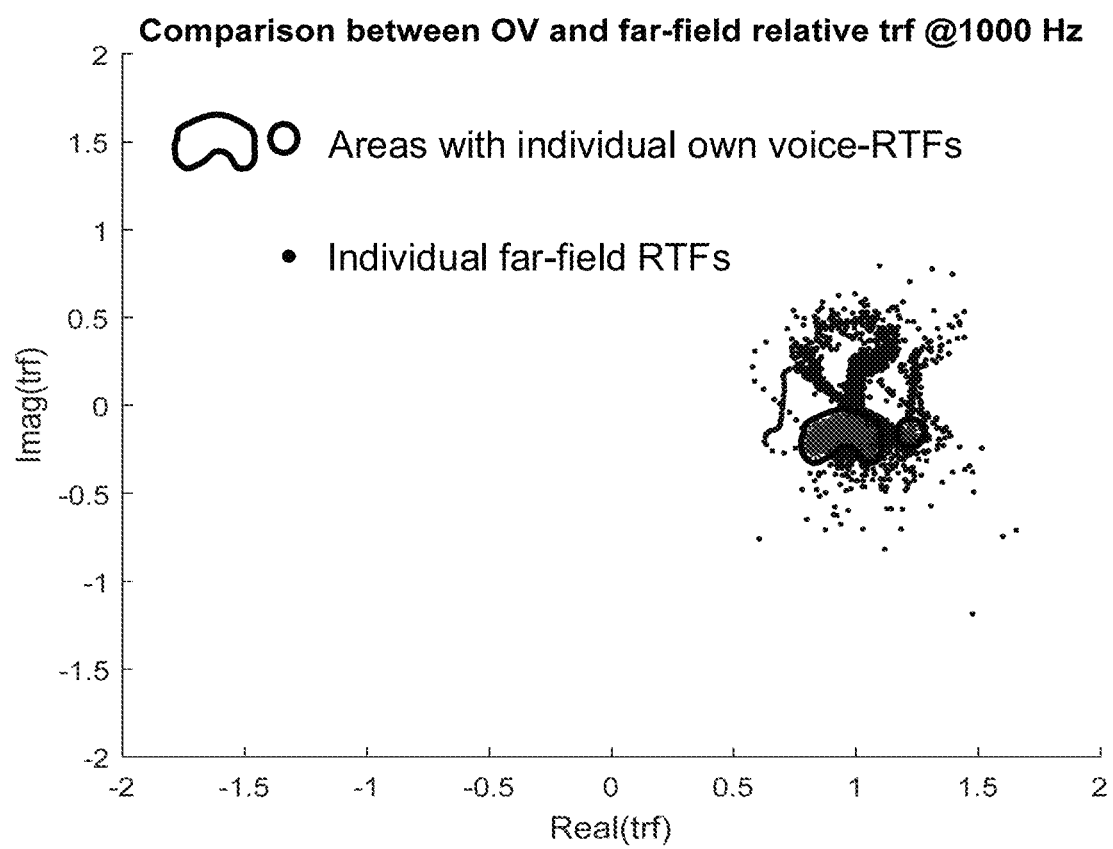
FIG. 5 shows a plot of complex (real part, imaginary part) relative own voice transfer functions (OV-RTF) measured across different individuals (asterisks) compared to far-field (FF-RTF) relative transfer functions measured across different individuals and across different directions (dots), FIG. 6A schematically shows a database ($O_l$, $H_l$) of absolute or relative acoustic transfer functions or impulse responses for a multitude of persons comprising corresponding own voice transfer functions (OVT) and head related transfer functions (HRTF), and FIG. 6B schematically indicates a setup for measurement of the own voice transfer functions (OVT) (or impulse responses, OIR) and acoustic head related transfer functions (HRTF) (or impulse responses, HRIR) for a microphone system located at the left and right tears of a person.

FIG. 5 shows relative own voice transfer functions (OV-RTF) measured across different individuals (asterisks) compared to far-field (FF-RTF) relative transfer functions measured across different individuals and across different directions (dots). FIG. 5 illustrates how a relative own voice transfer function (OV-RTF) measured across different individuals (each asterisk indicates an individual OV relative TF) compared to far-field transfer function measured across different individuals and across different directions (each dot indicates an individual far-field relative TF (FF-RTF)). It can be seen that the location in the complex plane of the OV-RTFs differs from most of the FF-RTFs. Knowing the typical location of the OV-RTF (not only at the shown frequency but across different frequencies) can be used to validate the estimated OV-RTF. It could e.g. be used to determine if the RTF could be used to update the weights of an OV-beamformer. The validation decision can be based on a distance measure between the estimated OV-RTF and the most likely OV-RTF, e.g. measured across different frequencies. Alternatively, the validation may be based on supervised learning (e.g. training a neural network based on examples of labelled valid and invalid OV-RTF).

The OV-RTF could be estimated in a controlled setup, where the user is prompted to speak. Alternatively, the OV-RTF could be estimated/updated, when OV is detected. The OV detector could be based on acoustic features, or alternatively/in addition on other features such as detected jaw vibrations (from an accelerometer or a vibration microphone) or based on individual features such as pitch frequency. The OV detection may also be based on results from another hearing instrument.

The validation procedure is exemplified with OV as an example. However, the described validation method may also be used to validate other impulse response measurements, such as a measured 0 degrees (frontal) impulse response (e.g. measured as described in EP2928215A1).

Figures 6A, 6B:
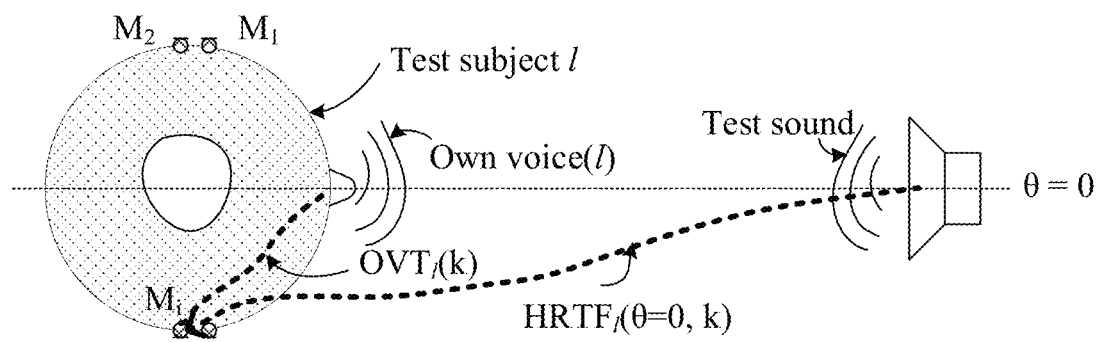

FIG. 6A schematically shows a database ($O_l$, $H_l$) of absolute or relative acoustic transfer functions or impulse responses for a multitude of persons (l=1, . . . , L) comprising corresponding own voice transfer functions ($OVT_l$) and acoustic (far-field) head related transfer functions ($HRTF_l$) for a number of test subjects. FIG. 6A shows a table comprising a left (first) column denoted 'Test subject l', l=1, . . . , L, a second (middle) column denoted $OVT_l(k,i)$, and a third (right column) denoted $HRTF_l(\theta_j,k,i)$, where j, k, and i are indices defining a direction to (or location of) an acoustic far field sound source (j=1, . . . , J), a frequency (k=1, . . . , K), and a microphone (i=1, . . . , M), respectively. Each row relates to a specific test object with index l' (e.g. a given person). Row l' comprises in the second column (e.g. predefined, e.g. measured) values of frequency dependent (k=1, . . . , K) own voice transfer functions ($OVT_{l'}$) for a given microphone ($M_i$, i=1, . . . , M) for the specific test object l'. Row l' further comprises in the third column (e.g. predefined, e.g. measured) values of frequency dependent (k=1, . . . , K) acoustic (far-field) head related transfer functions ($HRTF_{l'}$) for a number of directions to (or locations of) an acoustic far field sound source ($\theta_j$, j=1, . . . , J), for a given microphone ($M_i$, i=1, . . . , M) for the specific test object l'. The frequencies k for which values of transfer functions are provided in the database (e.g. the table of FIG. 6A) may be representative for the frequency range of operation of the hearing device, e.g. 0 to 10 kHz, or for the occurrence of speech. The frequencies k for which values are provided in the database may be limited in number, e.g. to less than or equal to eight, or less than or equal to four, e.g. at least one, or at least two. The number of microphones M of the hearing device or hearing system (e.g. a binaural hearing aid system) for which values of transfer functions are provided in the database may e.g. be all (M, or M−1 in case or relative transfer functions) or a subset of microphones, e.g. at least one microphone. The number of directions to (or locations of) an acoustic far field sound source ($\theta_j$, j=1, . . . , J) for which values of far field acoustic transfer functions are provided in the database may be representative of a space around the user wearing the hearing device or hearing system, e.g. evenly distributed, or it may be focused on directions (or locations) that are considered to be most important to the user, e.g. from one or more selected directions (e.g. including one or more of the front, the sides, and the back, e.g. in an appropriate distance for communication, e.g. one to two meters from the user). The number of directions to (or locations of) an acoustic far field sound source ($\theta_j$, j=1, . . . , J) for which values of far field acoustic transfer functions are provided in the database is larger than or equal to one, but may be limited to sixteen or to eight or to four.

FIG. 6B schematically indicates the measurement of own voice transfer functions ($OVT_l(k)$) and acoustic (far-field) head related transfer functions ($HRTF_l(\theta_j,k)$) for a microphone system comprising a multitude of microphones $M_i$, i=1, . . . , M, worn by specific person ('Test object l'). The microphones $M_i$ (i=1, 2, 3, 4) of FIG. 6A may e.g. represent microphones of a binaural hearing aid system comprising first and second hearing devices located at left and right ears of the person (l), each hearing device comprising two microphones (($M_1$, $M_2$) and ($M_3$, $M_4$), respectively) located at respective left and right ears of the person. The measurements may e.g. be performed in a sound studio by a hearing care professional (HCP). A frequency dependent own voice transfer function $OVT_l(k)$ for the person (l) for a specific microphone $M_i$ may be measured while the user speaks, e.g. a specific test word or sentence(s) (cf. 'Own voice(l) in FIG. 6B). The measurement may be repeated for different microphones. Likewise, a frequency dependent acoustic (far-field) head related transfer function ($HRTF_l(\theta_j,k)$) for the person ('Test subject l') for a specific microphone $M_i$ and location of the (far-field) sound source (here corresponding to a frontal direction ('$\theta=0$') relative to the person, cf. dotted line through the head of the person and the sound source) may be measured while the sound source is playing a test sound (cf. 'test sound' in FIG. 6B). The measurement may be repeated for different microphones and locations of the (far-field) sound source. The dashed circle around the test person may represent a typical distance of a conversation partner, e.g. 1-2 m. Far-field head related transfer function ($HRTF_l(\theta_j,k)$) may be measured and stored in the database for more than one distance e.g. for two or more distances from the test person, e.g. for distances 1 m and 3 m. The locations on a circle of a given radius, e.g. 1 m may not necessarily be equidistant, but may e.g. have a higher density of measurements locations in front of the person than to the rear of the person. The distribution of measurement points around the test object may be adapted to the application scenario envisioned (e.g. a fixed, e.g. car, application vs. a walk around teaching application).

Instead of measuring transfer functions at different frequencies, corresponding impulse responses (OIR, HRIR) may be measured and converted to the frequency domain by an appropriate transformation (e.g. a Fourier transformation algorithm, e.g. a discrete Fourier transformation (DFT) algorithm).

Figure 7:
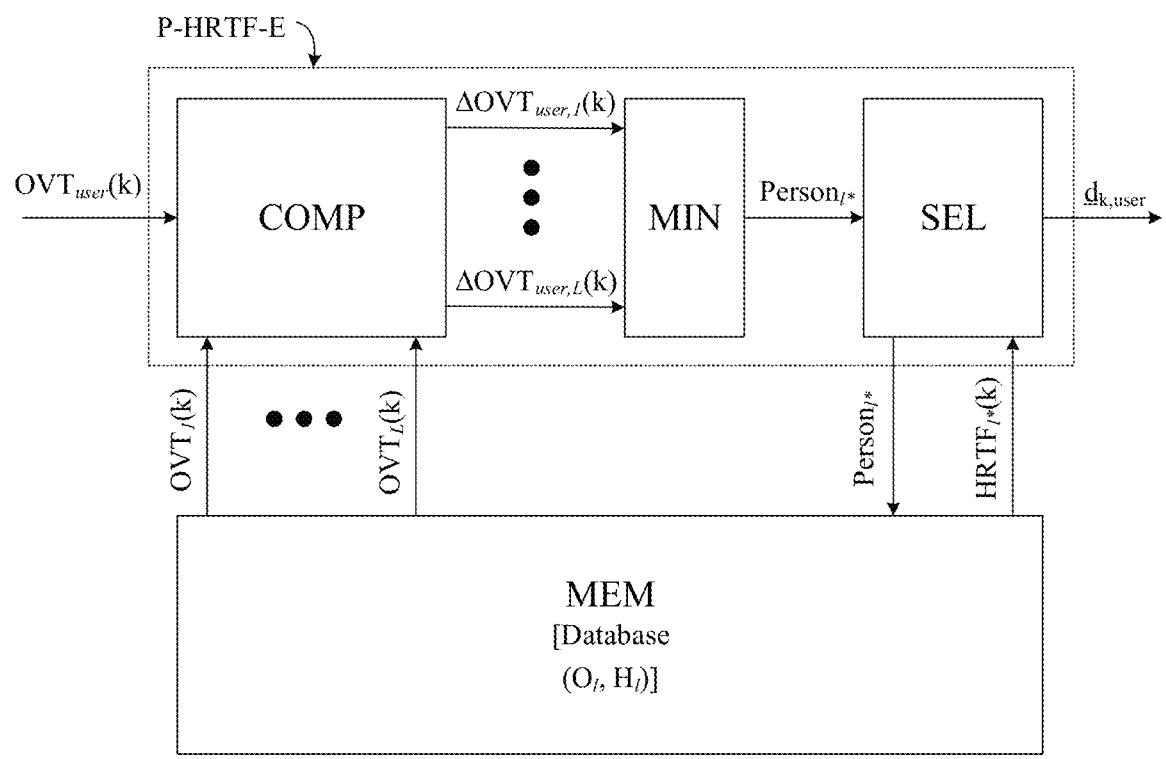
FIG. 7 shows an embodiment of a part of the processor for providing personalized acoustic far field head related transfer functions for a wearer of a hearing system, FIG. 8 schematically shows a hearing device of the receiver in the ear type according to an embodiment of the present disclosure.

FIG. 7 shows an embodiment of a part (P-HRTF-E) of the processor for estimating personalized (relative or absolute) acoustic far field head related transfer functions $d_{k,user}$ or impulse responses for a wearer of a hearing system. The personalized head related transfer functions estimator (P-HRTF-E) is configured to estimate the personalized relative or absolute head related acoustic transfer functions $d_{k,user}$ or impulse responses from an estimated own voice transfer function vector $OVT_{k,user}$ (based on currently received own voice signals by the microphones of the hearing device) by comparison with (predetermined, e.g. measured) transfer function (or impulse response) data stored in the database ($O_l$, $H_l$), cf. memory (MEM) in FIG. 7. The processor part (P-HRTF-E) comprises a comparator configured to compare an estimated own voice transfer function vector $OVT_{k,user}$ (e.g. estimated in another part (ROVTE) of the processor (PRO), cf. e.g. FIG. 3B) with the stored own voice transfer functions $OVT_l(k)$, l=1, . . . , L, of the database ($O_l$, $H_l$), cf. FIG. 6A. The comparator estimates for each own voice transfer function $OVT_l(k)$, l=1, . . . , L, of the database ($O_l$, $H_l$) a difference $\Delta OVT_{user,l}(k)$ to the estimated own voice transfer function vector $OVT_{k,user}$ (either for one microphone, or for several microphones or for all microphones of the hearing system). The processor part (P-HRTF-E) further comprises a minimizer (MIN) configured to identify the index l* for which the a difference $\Delta OVT_{user,l}(k)$ is minimum. The processor part (P-HRTF-E) further comprises a selector (SEL) for selecting the relative or absolute head related acoustic transfer functions $HRTF_l*(k)$ for the user l* among the L sets of transfer functions stored in the database ($O_l$, $H_l$) and to provide the personalized transfer functions as vector $d_{k,user}$. The personalized transfer functions as vector $d_{k,user}$ can e.g. be used to determine personalized beamformer weights of a beamformer, cf. e.g. FIG. 3A, 3C.

Figure 8:
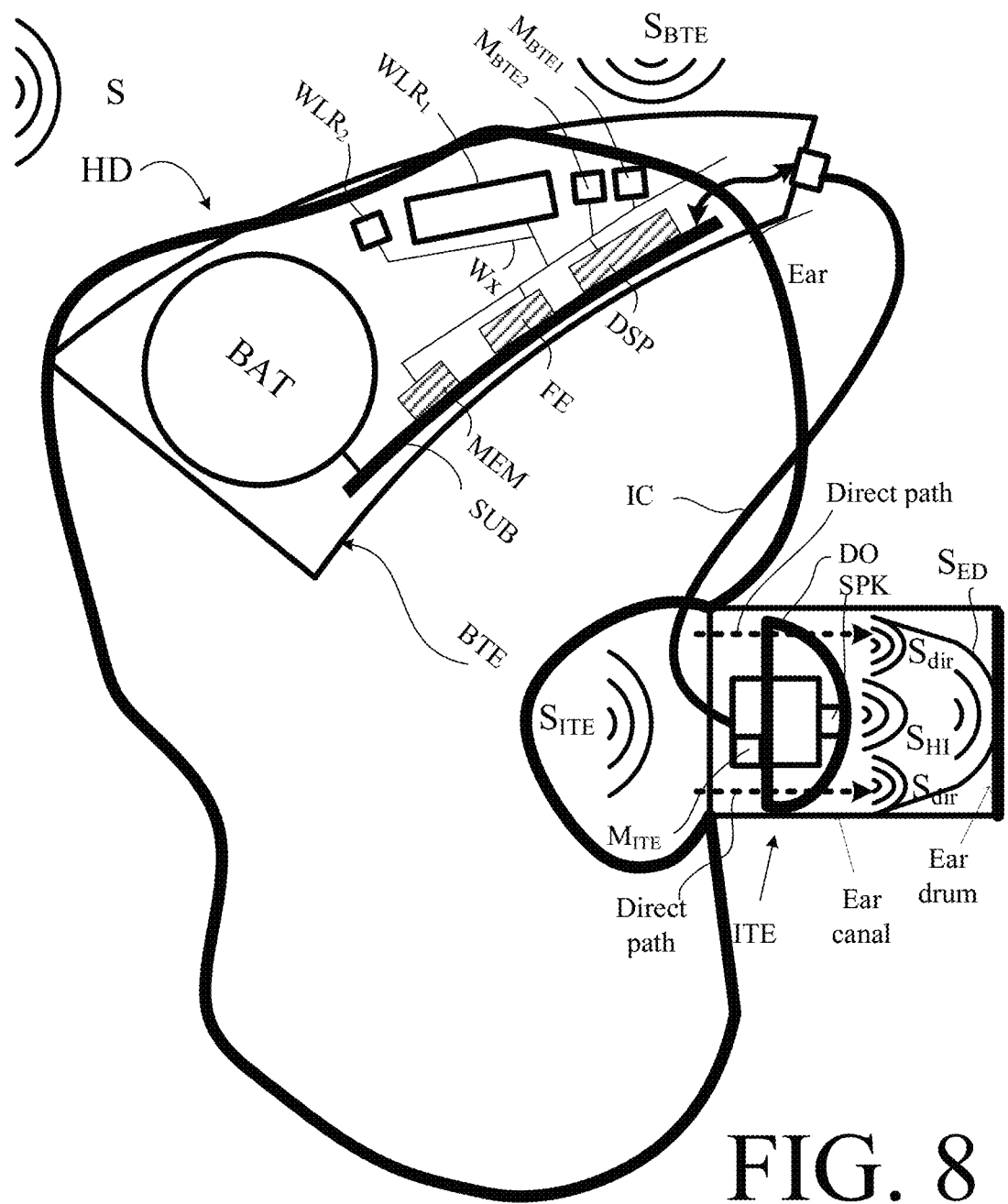

FIG. 8 shows a hearing device of the receiver in the ear type according to an embodiment of the present disclosure. FIG. 8 shows a BTE/RITE style hearing device according to an embodiment of the present disclosure (BTE='Behind-The-Ear'; RITE=Receiver-In-The-Ear'). The exemplary hearing device (HD), e.g. a hearing aid, is of a particular style (sometimes termed 'receiver-in-the ear', or RITE, style) comprising a BTE-part (BTE) adapted for being located at or behind an ear of a user, and an ITE-part (ITE) adapted for being located in or at an ear canal of the user's ear and comprising a receiver (=loudspeaker, SPK). The BTE-part and the ITE-part are connected (e.g. electrically connected) by a connecting element (IC) and internal wiring in the ITE- and BTE-parts (cf. e.g. wiring Wx in the BTE-part). The connecting element may alternatively be fully or partially constituted by a wireless link between the BTE- and ITE-parts. Other styles, e.g. where the ITE-part comprises or is constituted by a custom mould adapted to a user's ear and/or ear canal, may of course be used.

In the embodiment of a hearing device in FIG. 8, the BTE part comprises an input unit comprising two input transducers (e.g. microphones) ($M_{BTE1}$, $M_{BTE2}$), each for providing an electric input audio signal representative of an input sound signal ($S_{BTE}$) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices, e.g. a remote control or processing device, or a telephone, or another hearing device). Access to a database ($O_l$, $H_l$) of absolute or relative acoustic transfer functions or impulse responses according to the present disclosure may furthermore be provided via one of the wireless transceivers ($WLR_1$, $WLR_2$). The hearing device (HD) comprises a substrate (SUB) whereon a number of electronic components are mounted, including a memory (MEM), e.g. storing different hearing aid programs (e.g. user specific data, e.g. related to an audiogram, or parameter settings derived therefrom, e.g. defining such (user specific) programs, or other parameters of algorithms, e.g. beamformer filter weights, and/or fading parameters) and/or hearing aid configurations, e.g. input source combinations ($M_{BTE1}$, $M_{BTE2}$ ($M_{ITE}$), $WLR_1$, $WLR_2$), e.g. optimized for a number of different listening situations. The memory (MEM) may further comprise a database ($O_l$, $H_l$) of absolute or relative acoustic transfer functions or impulse responses according to the present disclosure. In a specific mode of operation, two or more of the electric input signals from the microphones are combined to provide a beamformed signal provided by applying appropriate (e.g. complex) weights to (at least some of) the respective signals. The beamformer weights are preferably personalized as proposed in the present disclosure.

The substrate (SUB) further comprises a configurable signal processor (DSP, e.g. a digital signal processor), e.g. including a processor for applying a frequency and level dependent gain, e.g. providing beamforming, noise reduction, filter bank functionality, and other digital functionality of a hearing device, e.g. implementing features according to the present disclosure. The configurable signal processor (DSP) is adapted to access the memory (MEM) e.g. for selecting appropriate parameters for a current configuration or mode of operation and/or listening situation and/or for writing data to the memory (e.g. algorithm parameters, e.g. for logging user behavior) and/or for accessing the database ($O_l$, $H_l$) of absolute or relative acoustic transfer functions or impulse responses according to the present disclosure. The configurable signal processor (DSP) is further configured to process one or more of the electric input audio signals and/or one or more of the directly received auxiliary audio input signals, based on a currently selected (activated) hearing aid program/parameter setting (e.g. either automatically selected, e.g. based on one or more sensors, or selected based on inputs from a user interface). The mentioned functional units (as well as other components) may be partitioned in circuits and components according to the application in question (e.g. with a view to size, power consumption, analogue vs. digital processing, acceptable latency, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals (e.g. interfaces to microphones and/or loudspeaker(s), and possibly to sensors/detectors). The input and output transducers may be individual separate components, or integrated (e.g. MEMS-based) with other electronic circuitry.

The hearing device (HD) further comprises an output unit (e.g. an output transducer) providing stimuli perceivable by the user as sound based on a processed audio signal from the processor or a signal derived therefrom. In the embodiment of a hearing device in FIG. 8, the ITE part comprises (at least a part of) the output unit in the form of a loudspeaker (also termed a 'receiver') (SPK) for converting an electric signal to an acoustic (air borne) signal, which (when the hearing device is mounted at an ear of the user) is directed towards the ear drum (Ear drum), where sound signal ($S_{ED}$) is provided. The ITE-part further comprises a guiding element, e.g. a dome, (DO) for guiding and positioning the ITE-part in the ear canal (Ear canal) of the user. In the embodiment of FIG. 8, the ITE-part further comprises a further input transducer, e.g. a microphone ($M_{ITE}$), for providing an electric input audio signal representative of an input sound signal ($S_{ITE}$) at the ear canal. Propagation of sound ($S_{ITE}$) from the environment to a residual volume at the ear drum via direct acoustic paths through the semi-open dome (DO) are indicated in FIG. 8 by dashed arrows (denoted Direct path). The directly propagated sound (indicated by sound fields $S_{dir}$) is mixed with sound from the hearing device (HD) (indicated by sound field $S_{HI}$) to a resulting sound field ($S_{ED}$) at the ear drum. The ITE-part may comprise a (possibly custom made) mould for providing a relatively tight fitting to the user's ear canal. The mould may comprise a ventilation channel to provide a (controlled) leakage of sound from the residual volume between the mould and the ear drum (to manage the occlusion effect).

The electric input signals (from input transducers $M_{BTE1}$, $M_{BTE2}$, $M_{ITE}$) may be processed in the time domain or in the (time-) frequency domain (or partly in the time domain and partly in the frequency domain as considered advantageous for the application in question).

All three ($M_{BTE1}$, $M_{BTE2}$, $M_{ITE}$) or two of the three microphones ($M_{BTE1}$, $M_{ITE}$) may be included in the 'personalization'-procedure for head related transfer functions according to the present disclosure. The 'front'-BTE-microphone ($M_{BTE1}$) may be selected as a reference microphone, and the 'rear'-BTE-microphone ($M_{BTE2}$) and/or the ITE-microphone ($M_{ITE}$) may be selected as normal microphones for which relative own-voice transfer functions can be measured by the hearing device. Since, relative to the hearing device user's own voice, the hearing device microphones ($M_{BTE1}$, $M_{BTE2}$, $M_{ITE}$) are located in the acoustic near-field, a relatively large level difference may be experienced for the own voice sound receive at the respective microphones. Thus, the relative transfer functions may be substantially different from 1.

In the embodiment of FIG. 8, the connecting element (IC) comprises electric conductors for connecting electric components of the BTE and ITE-parts. The connecting element (IC) may comprises an electric connector (CON) to attach the cable (IC) to a matching connector in the BTE-part. In another embodiment, the connecting element (IC) is an acoustic tube and the loudspeaker (SPK) is located in the BTE-part. In a still further embodiment, the hearing device comprises no BTE-part, but the whole hearing device is housed in the ear mould (ITE-part).

The embodiment of a hearing device (HD) exemplified in FIG. 8 is a portable device comprising a battery (BAT), e.g. a rechargeable battery, e.g. based on Li-Ion battery technology, e.g. for energizing electronic components of the BTE- and possibly ITE-parts. In an embodiment, the hearing device, e.g. a hearing aid, is adapted to provide a frequency dependent gain and/or a level dependent compression and/or a transposition (with or without frequency compression of one or more frequency ranges to one or more other frequency ranges), e.g. to compensate for a hearing impairment of a user. The BTE-part may e.g. comprise a connector (e.g. a DAI or USB connector) for connecting a 'shoe' with added functionality (e.g. an FM-shoe or an extra battery, etc.), or a programming device, or a charger, etc., to the hearing device (HD). Alternatively or additionally, the hearing device may comprise a wireless interface for programming and/or charging the hearing device.

Figure 9:
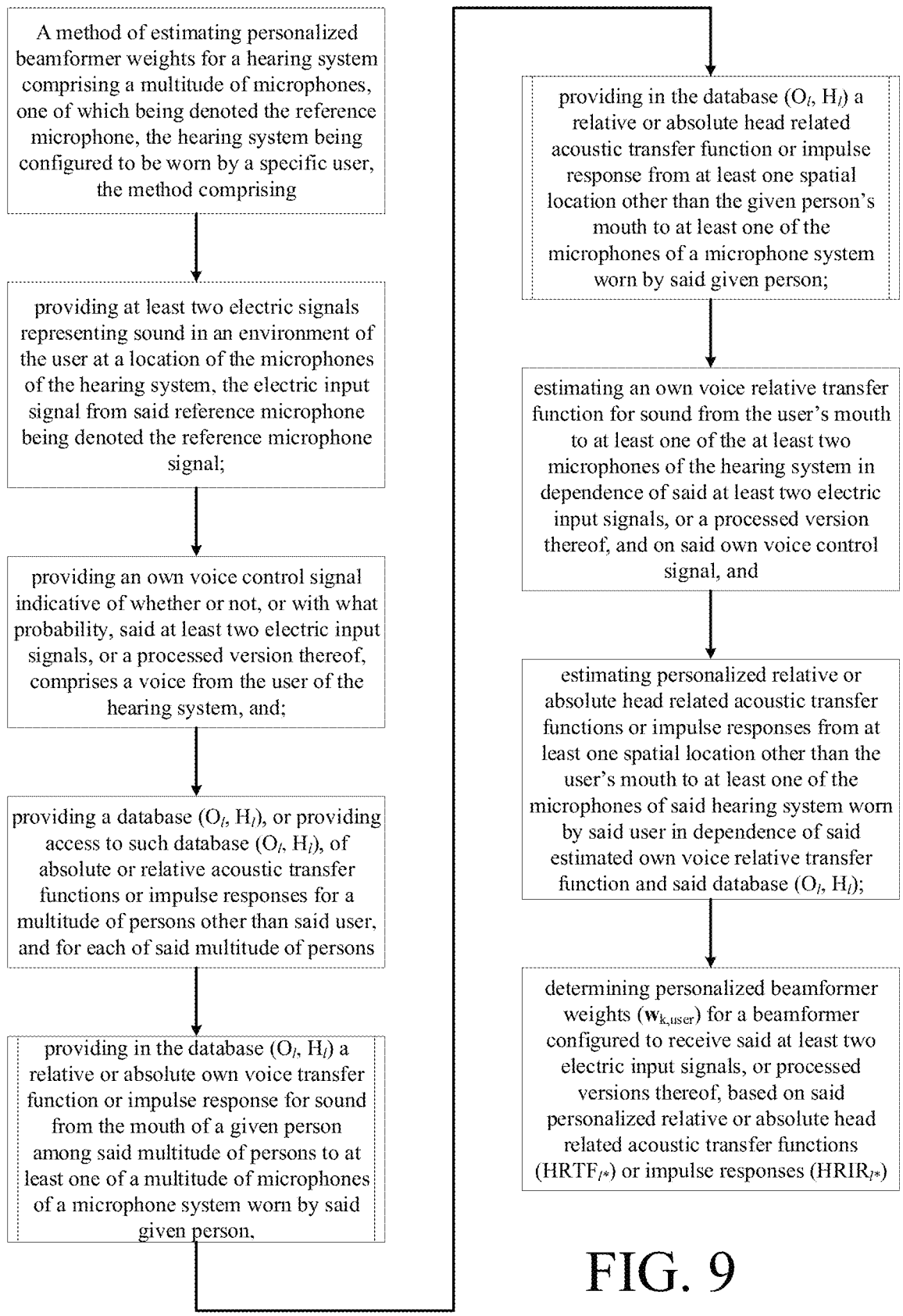
FIG. 9 shows a flow chart for an embodiment of a method of estimating personalized acoustic far-field transfer functions for a wearer of a hearing system.

FIG. 9 shows a flow chart for an embodiment of a method of estimating personalized acoustic far-field transfer functions for a wearer of a hearing system.

In an aspect, the present application proposes an offline or online procedure for estimating personalized beamformer coefficients for a particular user from information regarding personal own-voice-transfer function(s). The procedure comprises:

A. Measurement of own voice transfer function(s), using microphones located at an ear of the user, and optionally a close-talk microphone located at the mouth of a user;

B. Mapping of the measured own voice transfer function(s) to a set of absolute or relative head related transfer functions;

C. Computation of personalized beamformer coefficients from the set of head related transfer functions.

In an embodiment, a method of estimating personalized beamformer weights for a hearing system comprising a multitude of microphones, one of which being denoted the reference microphone, the hearing system being configured to be worn by a specific user is provided. The method comprises S1. providing at least two electric signals representing sound in an environment of the user at a location of the microphones of the hearing system, the electric input signal from said reference microphone being denoted the reference microphone signal;

S2. providing an own voice control signal indicative of whether or not, or with what probability, said at least two electric input signals, or a processed version thereof, comprises a voice from the user of the hearing system, and;

S3. providing a database ($O_l$, $H_l$), or providing access to such database ($O_l$, $H_l$), of absolute or relative acoustic transfer functions or impulse responses, or any transformation thereof, for a multitude of test-persons other than said user, and for each of said multitude of test-persons S3a. providing in the database ($O_l$, $H_l$) a relative or absolute own voice transfer function or impulse response, or any transformation thereof, for sound from the mouth of a given test-person among said multitude of test-persons to at least one of a multitude of microphones of a microphone system worn by said given test-person, and S3b. providing in the database ($O_l$, $H_l$) a relative or absolute head related acoustic transfer function or impulse response, or any transformation thereof, from at least one spatial location other than the given test-person's mouth to at least one of the microphones of a microphone system worn by said given test-person;

S4. estimating an own voice relative transfer function for sound from the user's mouth to at least one of the at least two microphones of the hearing system in dependence of said at least two electric input signals, or a processed version thereof, and on said own voice control signal, and S5. estimating personalized relative or absolute head related acoustic transfer functions or impulse responses from at least one spatial location other than the user's mouth to at least one of the microphones of said hearing system worn by said user in dependence of said estimated own voice relative transfer function and said database ($O_l$, $H_l$); and S6. determining personalized beamformer weights ($w_{k,user}$) for a beamformer configured to receive said at least two electric input signals, or processed versions thereof, based on said personalized relative or absolute head related acoustic transfer functions ($HRTF_{l*}$) or impulse responses ($HRIR_{l*}$).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

[Moore; 2019] A. H. Moore, J. M. de Haan, M. S. Pedersen, P. A. Naylor, M. Brookes, and J. Jensen, Personalized Signal-Independent Beamforming for Binaural Hearing Aids, J. Acoust. Soc. Am., Vol. 145, No. 5, pp. 2971-2981, April 2019.
[Loizou; 2013] P. C. Loizou, Speech Enhancement—Theory and Practice, CRC Press, 2nd edition, 2013.
[Brandstein; 2001] M. Brandstein, D. Ward (Eds.), Microphone Arrays—Signal Processing Techniques and Applications, Springer 2001.
[Marquardt; 2015] Development and evaluation of psychoacoustically motivated binaural noise reduction and cue preservation techniques, PhD Thesis, University of Oldenburg, Germany, November 2015.
EP2928215A1 (Oticon A/S) 7 Oct. 2015

The invention claimed is:

1. A hearing system configured to be located at or in an ear or in the head at the ear of a user, the hearing system comprising
at least two microphones, one of which being denoted the reference microphone, each for converting sound from the environment of the hearing system to an electric input signal representing said sound as received at the location of the microphone in question;
an own voice detector configured to estimate whether or not, or with what probability, said at least two electric input signals, comprises a voice from the user of the hearing system, and to provide an own voice control signal indicative thereof;
a memory wherein a database (Ol, Hl) of absolute or relative acoustic transfer functions or impulse responses, or a transformation thereof, for a multitude of test-persons are stored, or a transceiver allowing access to said database (Ol, Hl), the database (Ol, Hl) comprising for each of said multitude of test-persons
a relative or absolute own voice transfer function or impulse response, or a transformation thereof, for sound from the mouth of a given test-person among said multitude of test-persons to at least one of the microphones of a microphone system worn by said given test-person, and
a relative or absolute head related acoustic transfer function or impulse response, or a transformation thereof, from at least one spatial location other than the given test-person's mouth to at least one of the microphones of the microphone system worn by said given test-person;
a processor connected or connectable to the at least two microphones, to said own voice detector, and to said database, the processor being configured to estimate an own voice relative transfer function for sound from the user's mouth to at least one of the at least two microphones in dependence of said at least two electric input signals, and of said own voice control signal, and to estimate personalized relative or absolute head related acoustic transfer functions or impulse responses, or a transformation thereof, from at least one spatial location other than the user's mouth to at least one of the microphones of said hearing system worn by said user in dependence of said estimated own voice relative transfer function(s) and said database (Ol, Hl); and a beamformer configured to receive said at least two electric input signals, and to determine personalized beamformer weights based on said personalized relative or absolute head related acoustic transfer functions or impulse responses, or a transformation thereof, wherein a transform thereof is a Fourier or inverse Fourier transformation, a cosine or sine transformation, or a Laplace transformation.

2. A hearing system according to claim 1 comprising a detector or estimator of a current signal quality in dependence of said at least two electric input signals.

3. A hearing system according to claim 2 comprising an SNR estimator (SNRE) for providing an estimate of signal to noise ratio.

4. A hearing system according to claim 1 wherein the microphone systems worn by said multitude of test-persons comprise microphones located at the same positions as the at least two microphones of the hearing system.

5. A hearing system according to claim 1 wherein the processor comprises a relative own voice transfer function estimator (ROVTE) for estimating a relative own voice transfer function vector OVTk,user whose elements are the relative transfer functions for sound from the user's mouth to each of the at least two microphones of the hearing system.

6. A hearing system according to claim 1 comprising an own-voice power spectral density estimator (OV-PSDE) configured to provide an estimate of the own-voice power spectral density vector Sk at a given point in time.

7. A hearing system according to claim 1 comprising a personalized head related transfer functions estimator (P-HRTF-E) for estimating said personalized relative or absolute head related acoustic transfer functions dk,user or impulse responses from said estimated own voice transfer function vector OVTk,user and said database (Ol, Hl).

8. A hearing system according to claim 6 wherein said relative own voice transfer function vector OVTk,user is estimated from the input own-voice power spectral density vector Sk as OVTk,user=sqrt(Sk/Sk,iref), where iref is the index of a reference microphone among said at least two microphones.

9. A hearing system according to claim 1 comprising a trained neural network for determining the personalized head related transfer functions using the estimated relative own voice transfer function vector OVTk,user as an input vector.

10. A hearing system according to claim 1 being constituted by or comprising a hearing aid, a headset, an earphone, an ear protection device or a combination thereof.

11. A method of estimating personalized beamformer weights for a hearing system comprising at least two of microphones, one of which being denoted the reference microphone, the hearing system being configured to be worn by a specific user, the method comprising, providing at least two electric signals representing sound in an environment of the user at a location of the microphones of the hearing system, the electric input signal from said reference microphone being denoted the reference microphone signal;

providing an own voice control signal indicative of whether or not, or with what probability, said at least two electric input signals, comprises a voice from the user of the hearing system; and providing a database (Ol, Hl), or providing access to such database (Ol, Hl), of absolute or relative acoustic transfer functions or impulse responses, or a transformation thereof, for a multitude of test-persons other than said user, and for each of said multitude of test-persons providing in the database (Ol, Hl) a relative or absolute own voice transfer function or impulse response, or a transformation thereof, for sound from the mouth of a given test-person among said multitude of test-persons to at least one of the at least two microphones of a microphone system worn by said given test-person; and providing in the database (Ol, Hl) a relative or absolute head related acoustic transfer function or impulse response, or a transformation thereof, from at least one spatial location other than the given test-person's mouth to at least one of the microphones of a microphone system worn by said given test-person;

estimating an own voice relative transfer function for sound from the user's mouth to at least one of the at least two microphones of the hearing system in dependence of said at least two electric input signals, and on said own voice control signal, and estimating personalized relative or absolute head related acoustic transfer functions or impulse responses, or a transformation thereof, from at least one spatial location other than the user's mouth to at least one of the microphones of said hearing system worn by said user in dependence of said estimated own voice relative transfer function and said database (Ol, Hl); and determining personalized beamformer weights (wk,user) for a beamformer configured to receive said at least two electric input signals, based on said personalized relative or absolute head related acoustic transfer functions (HRTFl*) or impulse responses (HRlRl*), or a transformation thereof, wherein a transform thereof is a Fourier or inverse Fourier transformation, a cosine or sine transformation, or a Laplace transformation.

12. A method according to claim 11 comprising wherein the beamformer is binaural beamformer based on electric input signals from said at least two microphones located at left as well as right ears of the user.

13. A method according to claim 11 comprising mapping said relative own voice transfer function (OVTuser) or impulse response to an absolute or relative own voice transfer function (OVTl*) or impulse response of a specific test-person l* among said multitude of test-persons from said database (Ol, Hl) according to a predefined criterion; and deriving estimated absolute or relative far-field head related transfer functions (HRTFuser) for said user in dependence of the absolute or relative far-field head related transfer functions (HRTFl*) for said specific test-person stored in said database (Ol, Hl).

14. A method according to claim 11 wherein the predefined criterion comprises minimization of a cost function.

15. A method according to claim 11 comprising providing a beamformed signal based on said personalized beamformer weights.

16. A hearing system configured to be located at or in an ear, or in the head at the ear of a user, the hearing system comprising at least two microphones, one of which being denoted the reference microphone, each for converting sound from the environment of the hearing system to an electric input signal representing said sound as received at the location of the microphone in question;

an own voice detector configured to estimate whether or not, or with what probability, said at least two electric input signals, comprises a voice from the user of the hearing system, and to provide an own voice control signal indicative thereof;

a memory wherein a database (Ol, Hl) of absolute or relative acoustic transfer functions or impulse responses, or a transformation thereof, for a multitude of test-persons are stored, or a transceiver allowing access to said database (Ol, Hl), the database (Ol, Hl) comprising for each of said multitude of test-persons a relative or absolute own voice transfer function or impulse response, or a transformation thereof, for sound from the mouth of a given test-person among said multitude of test-persons to at least one of the microphones of a microphone system worn by said given test-person, and a relative or absolute head related acoustic transfer function or impulse response, or a transformation thereof, from at least one spatial location other than the given test-person's mouth to at least one of the microphones of the microphone system worn by said given test-person;

a processor connected or connectable to the at least two microphones, to said own voice detector, and to said database, the processor being configured to estimate an own voice relative transfer function for sound from the user's mouth to at least one of the at least two microphones in dependence of said at least two electric input signals, and of said own voice control signal, and to estimate personalized relative or absolute head related acoustic transfer functions or impulse responses, or a transformation thereof, from at least one spatial location other than the user's mouth to at least one of the microphones of said hearing system worn by said user in dependence of said estimated own voice relative transfer function(s) and said database (Ol, Hl), wherein a transform thereof is a Fourier or inverse Fourier transformation, a cosine or sine transformation, or a Laplace transformation.

17. A hearing system according to claim 16 comprising a signal processor configured to process said at least two electric signals in dependence of said estimated personalized relative or absolute head related acoustic transfer functions or impulse responses, or a transformation thereof.

18. A hearing system according to claim 17 wherein said signal processor is configured to at least two electric signals to process said at least two electric signals to compensate for a user's hearing impairment.

19. A method of estimating personalized relative or absolute head related acoustic transfer functions or impulse responses, or a transformation thereof, for a hearing system comprising at least two of microphones, one of which being denoted the reference microphone, the hearing system being configured to be worn by a specific user, the method comprising,
- providing at least two electric signals representing sound in an environment of the user at a location of the microphones of the hearing system, the electric input signal from said reference microphone being denoted the reference microphone signal;
- providing an own voice control signal indicative of whether or not, or with what probability, said at least two electric input signals, comprises a voice from the user of the hearing system; and
- providing a database (Ol, Hl), or providing access to such database (Ol, Hl), of absolute or relative acoustic transfer functions or impulse responses, or a transformation thereof, for a multitude of test-persons other than said user, and for each of said multitude of test-persons
- providing in the database (Ol, Hl) a relative or absolute own voice transfer function or impulse response, or a transformation thereof, for sound from the mouth of a given test-person among said multitude of test-persons to at least one of the at least two microphones of a microphone system worn by said given test-person; and
- providing in the database (Ol, Hl) a relative or absolute head related acoustic transfer function or impulse response, or a transformation thereof, from at least one spatial location other than the given test-person's mouth to at least one of the microphones of a microphone system worn by said given test-person;
- estimating an own voice relative transfer function for sound from the user's mouth to at least one of the at least two microphones of the hearing system in dependence of said at least two electric input signals, and on said own voice control signal, and
- estimating personalized relative or absolute head related acoustic transfer functions or impulse responses, or a transformation thereof, from at least one spatial location other than the user's mouth to at least one of the microphones of said hearing system worn by said user in dependence of said estimated own voice relative transfer function and said database (Ol, Hl),
- wherein a transform thereof is a Fourier or inverse Fourier transformation, a cosine or sine transformation, or a Laplace transformation.

20. A method according to claim 19 comprising processing said at least two electric signals in dependence of said estimated personalized relative or absolute head related acoustic transfer functions or impulse responses, or a transformation thereof.

* * * * *